(12) United States Patent
Borg et al.

(10) Patent No.: US 9,036,890 B2
(45) Date of Patent: May 19, 2015

(54) OPTICAL COIN DISCRIMINATION SYSTEMS AND METHODS FOR USE WITH CONSUMER-OPERATED KIOSKS AND THE LIKE

(75) Inventors: Jeffrey A. Borg, Newcastle, WA (US); Douglas A. Martin, Woodinville, WA (US); Timothy P. Harrington, Sammamish, WA (US)

(73) Assignee: Outerwall Inc., Bellevue, WA (US)

( * ) Notice: Subject to any disclaimer, the term of this patent is extended or adjusted under 35 U.S.C. 154(b) by 122 days.

(21) Appl. No.: 13/489,043

(22) Filed: Jun. 5, 2012

(65) Prior Publication Data
US 2013/0322730 A1    Dec. 5, 2013

(51) Int. Cl.
*G06K 9/00* (2006.01)
*G06K 9/52* (2006.01)
*G07D 5/02* (2006.01)

(52) U.S. Cl.
CPC . *G06K 9/522* (2013.01); *G07D 5/02* (2013.01)

(58) Field of Classification Search
None
See application file for complete search history.

(56) References Cited

U.S. PATENT DOCUMENTS

| | | |
|---|---|---|
| 269,461 A | 12/1882 | Rakestraw |
| 379,811 A | 3/1888 | Reimann |
| 382,864 A | 5/1888 | Breese |
| 382,867 A | 5/1888 | Claspy |
| 383,166 A | 5/1888 | Bailey |
| 446,303 A | 2/1891 | Thompson |
| 545,185 A | 8/1895 | Yost |
| 1,010,993 A | 12/1911 | White |
| 1,234,707 A | 7/1917 | Whistler |
| 1,345,858 A | 7/1920 | Jenikns |
| 1,473,745 A | 11/1923 | Stedman |
| 1,585,242 A | 5/1926 | Hegeman |
| 1,668,626 A | 5/1928 | Brandt |
| 1,711,049 A | 4/1929 | Fonda et al. |

(Continued)

FOREIGN PATENT DOCUMENTS

| | | |
|---|---|---|
| AU | 695403 B2 | 8/1998 |
| AU | 714452 B2 | 1/2000 |

(Continued)

OTHER PUBLICATIONS

Marco Reisert, OlafRonneberger, and Hans Burkhardt, "A Fast and Reliable Coin Recognition System", 2007, Pattern Recognition—Lecture Notes in Computer Science, vol. 4713, pp. 415-424.*

(Continued)

*Primary Examiner* — Barry Drennan
*Assistant Examiner* — Siamak Harandi
(74) *Attorney, Agent, or Firm* — Perkins Coie LLP

(57) ABSTRACT

Systems and associated methods for optical coin discrimination are disclosed herein. In one embodiment, a method for discriminating coins includes obtaining a digital image of a coin, identifying the outline of the coin using a suitable algorithm, and determining the diameter of the coin using the outline of the coin. The method of this embodiment further includes generating a rectangular image of the coin using, for example, a log-polar transform, generating a series of, for example, Fourier transforms from the rectangular image, and identifying spectral peak locations and intensities in the Fourier transform results. The diameter of the coin, spectral peak location, spectral peak intensity of the coin and/or other aspects of the coin can then be compared to known values for different coins to discriminate the coin.

31 Claims, 13 Drawing Sheets

(56) References Cited

U.S. PATENT DOCUMENTS

| | | | |
|---|---|---|---|
| 1,813,296 | A | 7/1931 | Kidwell |
| 1,847,940 | A | 3/1932 | Giles |
| 1,945,948 | A | 2/1934 | Morin |
| 2,014,505 | A | 9/1935 | Patche |
| 2,119,676 | A | 6/1938 | Heller |
| 2,317,351 | A | 4/1943 | Andalikiewicz et al. |
| 2,336,606 | A | 12/1943 | Clarence |
| 2,390,147 | A | 12/1945 | Hatton |
| 2,398,955 | A | 4/1946 | O'toole |
| 2,461,314 | A | 2/1949 | Davis et al. |
| 2,519,357 | A | 8/1950 | Dougherty |
| 2,569,360 | A | 9/1951 | Weingart |
| 2,621,665 | A | 12/1952 | McGee |
| 2,644,470 | A | 7/1953 | Labbe |
| 2,646,805 | A | 7/1953 | Anderson |
| 2,856,561 | A | 12/1958 | Rosapepe |
| 2,865,561 | A | 12/1958 | Rosapepe |
| 2,869,723 | A | 1/1959 | Autio |
| 2,881,774 | A | 4/1959 | Labbe |
| 2,960,377 | A | 1/1960 | Simjian |
| 2,931,480 | A | 4/1960 | Heim |
| 2,964,181 | A | 12/1960 | Demarest et all. |
| 3,007,576 | A | 11/1961 | Hannaford |
| 3,009,555 | A | 11/1961 | Seckula, Sr. |
| 3,048,251 | A | 8/1962 | Bower |
| 3,056,132 | A | 9/1962 | Simjian |
| 3,065,467 | A | 11/1962 | Prevost |
| 3,066,858 | A | 12/1962 | Tipton |
| 3,121,435 | A | 2/1964 | White |
| 3,132,654 | A | 5/1964 | Adams |
| 3,147,839 | A | 9/1964 | White, Jr. |
| 3,173,742 | A | 3/1965 | Simjian |
| 3,196,257 | A | 7/1965 | Buchholtz et al. |
| 3,196,887 | A | 7/1965 | White, Jr. |
| 3,286,805 | A | 11/1966 | New |
| 3,292,818 | A | 12/1966 | Jaworski |
| 3,297,242 | A | 1/1967 | Karp |
| 3,381,694 | A | 5/1968 | Lempke |
| 3,396,737 | A | 8/1968 | Picollo |
| 3,415,348 | A | 12/1968 | Wahlberg |
| 3,416,337 | A | 12/1968 | Hutchins |
| 3,463,171 | A | 8/1969 | Dolman |
| 3,589,492 | A | 6/1971 | Shirley |
| 3,599,771 | A | 8/1971 | Hinterstocker et al. |
| 3,603,327 | A | 9/1971 | Buchholz et al. |
| 3,653,481 | A | 4/1972 | Boxall et al. |
| 3,680,566 | A | 8/1972 | Tanaka et al. |
| 3,695,448 | A | 10/1972 | Johansson et al. |
| 3,752,168 | A | 8/1973 | Bayha |
| 3,763,871 | A | 10/1973 | Jobst et al. |
| 3,788,440 | A | 1/1974 | Propice et al. |
| 3,791,574 | A | 2/1974 | Picquot et al. |
| 3,797,307 | A | 3/1974 | Johnston |
| 3,804,249 | A | 4/1974 | Gibbons et al. |
| 3,815,717 | A | 6/1974 | Arseneau |
| 3,818,918 | A | 6/1974 | Nissmo et al. |
| 3,870,137 | A | 3/1975 | Fougere |
| 3,901,368 | A | 8/1975 | Klinger |
| 3,903,721 | A | 9/1975 | Aaron |
| 3,941,226 | A | 3/1976 | Drakes |
| 3,948,280 | A | 4/1976 | Dahl et al. |
| 3,952,851 | A | 4/1976 | Fougere et al. |
| 3,960,293 | A | 6/1976 | Sweet, II et al. |
| 3,965,912 | A | 6/1976 | Gross et al. |
| 3,969,584 | A | 7/1976 | Miller et al. |
| 3,982,620 | A | 9/1976 | Kortenhaus |
| 3,984,660 | A | 10/1976 | Oka et al. |
| 3,998,237 | A | 12/1976 | Kressin et al. |
| 4,014,424 | A | 3/1977 | Hall |
| 4,036,242 | A | 7/1977 | Breitenstein et al. |
| 4,058,954 | A | 11/1977 | Asami et al. |
| 4,059,122 | A | 11/1977 | Kinoshita |
| 4,071,740 | A | 1/1978 | Gogulski |
| 4,083,776 | A | 4/1978 | Shimoiizaka et al. |
| 4,089,400 | A | 5/1978 | Gregory, Jr. |
| 4,092,990 | A | 6/1978 | Bayne |
| 4,099,722 | A | 7/1978 | Rodesch et al. |
| 4,100,925 | A | 7/1978 | Fukunaga et al. |
| 4,106,610 | A | 8/1978 | Heiman |
| 4,111,216 | A | 9/1978 | Brisebarre et al. |
| 4,124,109 | A | 11/1978 | Bissell et al. |
| 4,141,372 | A | 2/1979 | Gdanski |
| 4,148,331 | A | 4/1979 | Nicolaus |
| 4,167,949 | A | 9/1979 | Hashimoto et al. |
| 4,172,462 | A | 10/1979 | Uchida et al. |
| 4,184,366 | A | 1/1980 | Butler |
| 4,199,744 | A | 4/1980 | Aldridge et al. |
| 4,216,461 | A | 8/1980 | Werth et al. |
| 4,225,056 | A | 9/1980 | Flubacker |
| 4,228,811 | A | 10/1980 | Tanaka et al. |
| 4,230,213 | A | 10/1980 | Spring |
| 4,236,999 | A | 12/1980 | Burgess et al. |
| 4,238,324 | A | 12/1980 | Musselmann et al. |
| 4,240,589 | A | 12/1980 | Martin et al. |
| 4,249,552 | A | 2/1981 | Margolin et al. |
| 4,266,121 | A | 5/1981 | Hirose et al. |
| 4,266,651 | A | 5/1981 | Strom |
| 4,275,751 | A | 6/1981 | Bergman |
| 4,278,543 | A | 7/1981 | Maniquis et al. |
| 4,286,704 | A | 9/1981 | Wood t al. |
| 4,301,909 | A | 11/1981 | Snavely |
| 4,306,644 | A | 12/1981 | Rockola et al. |
| 4,321,672 | A | 3/1982 | Braun et al. |
| 4,326,620 | A | 4/1982 | Felix et al. |
| 4,334,604 | A | 6/1982 | Davies |
| 4,346,798 | A | 8/1982 | Agey, III |
| 4,356,829 | A | 11/1982 | Furuya et al. |
| 4,360,034 | A | 11/1982 | Davila et al. |
| 4,369,442 | A | 1/1983 | Werth et al. |
| 4,369,800 | A | 1/1983 | Watanabe et al. |
| 4,374,557 | A | 2/1983 | Sugimoto et al. |
| 4,376,442 | A | 3/1983 | Gomez et al. |
| 4,380,316 | A | 4/1983 | Glinka et al. |
| 4,383,540 | A | 5/1983 | De Meyer et al. |
| 4,398,550 | A | 8/1983 | Shireman |
| 4,412,292 | A | 10/1983 | Sedam et al. |
| 4,412,607 | A | 11/1983 | Collins et al. |
| 4,414,467 | A | 11/1983 | Gould et al. |
| 4,416,334 | A | 11/1983 | Bouillon |
| 4,416,365 | A | 11/1983 | Heiman |
| 4,434,359 | A | 2/1984 | Watanabe |
| 4,436,103 | A | 3/1984 | Dick |
| 4,437,558 | A | 3/1984 | Nicholson et al. |
| 4,442,850 | A | 4/1984 | Austin et al. |
| 4,447,714 | A | 5/1984 | Lundblad et al. |
| 4,448,297 | A | 5/1984 | Mendelsohn |
| 4,460,003 | A | 7/1984 | Barnes et al. |
| 4,469,213 | A | 9/1984 | Nicholson et al. |
| 4,471,864 | A | 9/1984 | Marshall |
| 4,488,116 | A | 12/1984 | Plesko |
| 4,503,963 | A | 3/1985 | Steiner |
| 4,504,357 | A | 3/1985 | Holbein et al. |
| 4,506,685 | A | 3/1985 | Childers et al. |
| 4,509,122 | A | 4/1985 | Agnew et al. |
| 4,509,542 | A | 4/1985 | Watanabe et al. |
| 4,509,633 | A | 4/1985 | Chow |
| 4,512,453 | A | 4/1985 | Schuller et al. |
| 4,533,054 | A | 8/1985 | Sommer, Jr. et al. |
| 4,534,492 | A | 8/1985 | Schwarzli |
| 4,535,915 | A | 8/1985 | West |
| 4,538,719 | A | 9/1985 | Gray et al. |
| 4,542,817 | A | 9/1985 | Paulson |
| 4,543,969 | A | 10/1985 | Rasmussen |
| 4,554,446 | A | 11/1985 | Murphy et al. |
| 4,555,618 | A | 11/1985 | Riskin |
| 4,556,140 | A | 12/1985 | Okada et al. |
| 4,558,711 | A | 12/1985 | Ikuta Yoshiaki et al. |
| 4,558,712 | A | 12/1985 | Sentoku et al. |
| 4,574,824 | A | 3/1986 | Paulsen et al. |
| 4,577,744 | A | 3/1986 | Doucet et al. |
| 4,587,984 | A | 5/1986 | Levasseur et al. |
| 4,588,712 | A | 5/1986 | Toscano |
| 4,597,487 | A | 7/1986 | Crosby et al. |
| 4,598,378 | A | 7/1986 | Giacomo |

(56) References Cited

U.S. PATENT DOCUMENTS

| | | |
|---|---|---|
| 4,611,205 A | 9/1986 | Eglise et al. |
| 4,616,323 A | 10/1986 | Hayashi |
| 4,616,776 A | 10/1986 | Blumenthal et al. |
| 4,620,559 A | 11/1986 | Childers et al. |
| 4,622,456 A | 11/1986 | Naruto et al. |
| 4,625,851 A | 12/1986 | Johnson et al. |
| 4,641,239 A | 2/1987 | Takesako |
| 4,667,093 A | 5/1987 | MacDonald et al. |
| 4,672,377 A | 6/1987 | Murphy et al. |
| 4,677,565 A | 6/1987 | Ogaki et al. |
| 4,694,845 A | 9/1987 | Zay |
| 4,706,577 A | 11/1987 | Jones et al. |
| 4,706,795 A | 11/1987 | Mikami et al. |
| 4,716,799 A | 1/1988 | Hartmann |
| 4,723,212 A | 2/1988 | Mindrum et al. |
| 4,733,765 A | 3/1988 | Watanabe et al. |
| 4,753,625 A | 6/1988 | Okada et al. |
| 4,754,862 A | 7/1988 | Rawicz-Szczerbo et al. |
| 4,767,917 A | 8/1988 | Ushikubo |
| 4,775,353 A | 10/1988 | Childers et al. |
| 4,775,354 A | 10/1988 | Rasmussen et al. |
| 4,809,837 A | 3/1989 | Hayashi et al. |
| 4,809,838 A | 3/1989 | Houserman |
| 4,814,589 A | 3/1989 | Storch et al. |
| 4,827,423 A | 5/1989 | Beasley et al. |
| 4,831,374 A | 5/1989 | Masel |
| 4,833,308 A | 5/1989 | Humble |
| 4,836,352 A | 6/1989 | Tateno et al. |
| 4,842,119 A | 6/1989 | Abe et al. |
| 4,866,661 A | 9/1989 | de Prins |
| 4,872,618 A | 10/1989 | Sato et al. |
| 4,882,675 A | 11/1989 | Nichtberger et al. |
| 4,882,724 A | 11/1989 | Vela et al. |
| 4,883,158 A | 11/1989 | Kobayashi et al. |
| 4,884,672 A | 12/1989 | Parker |
| 4,895,238 A | 1/1990 | Speas |
| 4,896,791 A | 1/1990 | Smith |
| 4,898,564 A | 2/1990 | Gunn et al. |
| 4,910,672 A | 3/1990 | Off et al. |
| 4,914,381 A | 4/1990 | Narod et al. |
| 4,915,205 A | 4/1990 | Reid et al. |
| 4,921,463 A | 5/1990 | Primdahl et al. |
| 4,926,997 A | 5/1990 | Parker |
| 4,936,435 A | 6/1990 | Griner |
| 4,936,436 A | 6/1990 | Keltner |
| 4,950,986 A | 8/1990 | Guerrero |
| 4,953,086 A | 8/1990 | Fukatsu et al. |
| 4,959,624 A | 9/1990 | Higgins, Jr. et al. |
| 4,960,196 A | 10/1990 | Kanehara et al. |
| 4,963,118 A | 10/1990 | Gunn et al. |
| 4,964,495 A | 10/1990 | Rasmussen |
| 4,969,549 A | 11/1990 | Eglise |
| 4,977,502 A | 12/1990 | Baker et al. |
| 4,978,322 A | 12/1990 | Paulsen |
| 4,995,497 A | 2/1991 | Kai et al. |
| 4,995,848 A | 2/1991 | Goh et al. |
| 4,997,406 A | 3/1991 | Horiguchi et al. |
| 5,010,238 A | 4/1991 | Kadono et al. |
| 5,021,967 A | 6/1991 | Smith |
| 5,022,889 A | 6/1991 | Ristvedt et al. |
| 5,025,139 A | 6/1991 | Halliburton, Jr. |
| 5,027,937 A | 7/1991 | Parish et al. |
| 5,030,165 A | 7/1991 | Nilsson et al. |
| 5,039,848 A | 8/1991 | Stoken |
| 5,040,657 A | 8/1991 | Gunn et al. |
| 5,042,635 A | 8/1991 | Bell |
| 5,055,657 A | 10/1991 | Miller et al. |
| 5,056,644 A | 10/1991 | Parker |
| 5,067,604 A | 11/1991 | Metcalf |
| 5,073,767 A | 12/1991 | Holmes et al. |
| 5,078,252 A | 1/1992 | Furuya et al. |
| 5,083,765 A | 1/1992 | Kringel |
| 5,083,814 A | 1/1992 | Guinta et al. |
| 5,088,587 A | 2/1992 | Goodrich et al. |
| 5,091,713 A | 2/1992 | Horne et al. |
| 5,097,934 A | 3/1992 | Quinlan, Jr. |
| 5,098,339 A | 3/1992 | Dabrowski |
| 5,098,340 A | 3/1992 | Abe |
| 5,100,367 A | 3/1992 | Abe et al. |
| 5,111,927 A | 5/1992 | Schulze, Jr. |
| 5,113,974 A | 5/1992 | Vayda |
| 5,114,381 A | 5/1992 | Ueda et al. |
| 5,122,094 A | 6/1992 | Abe et al. |
| 5,131,885 A | 7/1992 | Nakao et al. |
| 5,135,433 A | 8/1992 | Watanabe et al. |
| 5,145,046 A | 9/1992 | Satoh et al. |
| 5,151,684 A | 9/1992 | Johnsen |
| 5,158,166 A | 10/1992 | Barson et al. |
| 5,163,868 A | 11/1992 | Adams et al. |
| 5,166,886 A | 11/1992 | Molnar et al. |
| 5,167,571 A | 12/1992 | Waller |
| 5,168,961 A | 12/1992 | Schneider |
| 5,173,851 A | 12/1992 | Off et al. |
| 5,174,608 A | 12/1992 | Benardelli et al. |
| 5,183,142 A | 2/1993 | Latchinian et al. |
| 5,191,957 A | 3/1993 | Hayes et al. |
| 5,195,626 A | 3/1993 | Le Hong et al. |
| 5,199,545 A | 4/1993 | Takamisawa et al. |
| 5,201,396 A | 4/1993 | Chalabian et al. |
| 5,217,100 A | 6/1993 | Thompson et al. |
| 5,219,059 A | 6/1993 | Furuya et al. |
| 5,222,584 A | 6/1993 | Zouzoulas |
| 5,226,519 A | 7/1993 | DeWoolfson |
| 5,226,520 A | 7/1993 | Parker |
| 5,227,874 A | 7/1993 | Von Kohorn |
| 5,227,966 A | 7/1993 | Ichiba |
| 5,236,074 A | 8/1993 | Gotaas et al. |
| 5,236,339 A | 8/1993 | Nishiumi et al. |
| 5,244,070 A | 9/1993 | Carmen et al. |
| 5,251,738 A | 10/1993 | Dabrowski |
| 5,252,811 A | 10/1993 | Henochowicz et al. |
| 5,254,032 A | 10/1993 | Abe et al. |
| 5,263,566 A | 11/1993 | Nara et al. |
| 5,279,404 A | 1/1994 | Bruner et al. |
| 5,282,769 A | 2/1994 | Suzukawa |
| 5,285,883 A | 2/1994 | Le Hong et al. |
| 5,291,782 A | 3/1994 | Taylor |
| 5,293,979 A | 3/1994 | Levasseur |
| 5,293,980 A | 3/1994 | Parker |
| 5,293,981 A | 3/1994 | Abe et al. |
| 5,299,673 A | 4/1994 | Wu |
| 5,302,811 A | 4/1994 | Fukatsu et al. |
| 5,316,120 A | 5/1994 | Ibarrola |
| 5,316,517 A | 5/1994 | Chiba et al. |
| 5,317,135 A | 5/1994 | Finocchio |
| 5,321,242 A | 6/1994 | Heath, Jr. |
| 5,323,891 A | 6/1994 | Waite et al. |
| 5,326,312 A | 7/1994 | Patroni |
| 5,330,041 A | 7/1994 | Dobbins et al. |
| 5,337,253 A | 8/1994 | Berkovsky et al. |
| 5,345,071 A | 9/1994 | Dumont |
| 5,346,049 A | 9/1994 | Nakajima et al. |
| 5,347,115 A | 9/1994 | Sherman et al. |
| 5,350,906 A | 9/1994 | Brody et al. |
| 5,351,798 A | 10/1994 | Hayes |
| 5,355,988 A | 10/1994 | Shirasawa |
| 5,356,333 A | 10/1994 | Bointon et al. |
| 5,360,093 A | 11/1994 | Baer |
| 5,361,871 A | 11/1994 | Gupta et al. |
| 5,365,046 A | 11/1994 | Haymann |
| 5,374,814 A | 12/1994 | Kako et al. |
| 5,379,875 A | 1/1995 | Shames et al. |
| 5,379,876 A | 1/1995 | Hutton |
| 5,386,901 A | 2/1995 | Ibarrola et al. |
| 5,386,902 A | 2/1995 | Bointon et al. |
| 5,388,680 A | 2/1995 | Hird et al. |
| 5,390,515 A | 2/1995 | Essick |
| 5,392,891 A | 2/1995 | Ferguson et al. |
| 5,404,985 A | 4/1995 | Baughman |
| 5,408,417 A | 4/1995 | Wilder |
| 5,409,092 A | 4/1995 | Itako et al. |
| 5,421,147 A | 6/1995 | Holden et al. |
| 5,429,222 A | 7/1995 | Delay |
| 5,429,551 A | 7/1995 | Uecker et al. |

(56) References Cited

U.S. PATENT DOCUMENTS

| | | |
|---|---|---|
| 5,431,270 A | 7/1995 | Wohlrab et al. |
| 5,433,310 A | 7/1995 | Bell |
| 5,435,777 A | 7/1995 | Takatani et al. |
| 5,439,089 A | 8/1995 | Parker |
| 5,441,139 A | 8/1995 | Abe et al. |
| 5,448,226 A | 9/1995 | Failing, Jr. et al. |
| 5,449,058 A | 9/1995 | Kotler et al. |
| 5,452,785 A | 9/1995 | Iwamoto et al. |
| 5,457,305 A | 10/1995 | Akel et al. |
| 5,458,225 A | 10/1995 | Iwamoto et al. |
| 5,460,256 A | 10/1995 | Levasseur |
| 5,461,561 A | 10/1995 | Ackerman et al. |
| 5,469,951 A | 11/1995 | Takemoto et al. |
| 5,469,952 A | 11/1995 | Kershaw et al. |
| 5,477,952 A | 12/1995 | Castellano et al. |
| 5,480,061 A | 1/1996 | Ellinger |
| 5,483,363 A | 1/1996 | Holmes et al. |
| 5,484,334 A | 1/1996 | Evdokimo |
| 5,489,015 A | 2/1996 | Wood et al. |
| 5,494,145 A | 2/1996 | Cohrs et al. |
| 5,494,147 A | 2/1996 | Takahashi et al. |
| 5,499,707 A | 3/1996 | Steury |
| 5,501,633 A | 3/1996 | Watkins et al. |
| 5,503,262 A | 4/1996 | Baudat et al. |
| 5,506,393 A | 4/1996 | Ziarno |
| 5,513,738 A | 5/1996 | Hird et al. |
| 5,515,960 A | 5/1996 | Wood et al. |
| 5,522,491 A | 6/1996 | Baudat et al. |
| 5,531,640 A | 7/1996 | Inoue |
| 5,535,872 A | 7/1996 | Smith et al. |
| 5,546,316 A | 8/1996 | Buckley et al. |
| 5,554,070 A | 9/1996 | Takatoshi et al. |
| 5,555,497 A | 9/1996 | Helbling |
| 5,560,467 A | 10/1996 | Takemoto |
| 5,564,546 A | 10/1996 | Molbak et al. |
| 5,573,099 A | 11/1996 | Church et al. |
| 5,577,959 A | 11/1996 | Takemoto et al. |
| 5,579,887 A | 12/1996 | Leibu et al. |
| 5,583,487 A | 12/1996 | Ackerman et al. |
| 5,595,264 A | 1/1997 | Trotta, Jr. |
| 5,616,074 A | 4/1997 | Chen et al. |
| 5,619,932 A | 4/1997 | Efland et al. |
| 5,620,079 A | 4/1997 | Molbak |
| 5,624,017 A | 4/1997 | Plesko |
| 5,637,845 A | 6/1997 | Kolls |
| 5,641,050 A | 6/1997 | Smith et al. |
| 5,650,604 A | 7/1997 | Marcous et al. |
| 5,652,421 A | 7/1997 | Veeneman et al. |
| 5,665,952 A | 9/1997 | Ziarno |
| 5,679,070 A | 10/1997 | Ishida et al. |
| 5,687,830 A | 11/1997 | Hayes et al. |
| 5,695,395 A | 12/1997 | Ota et al. |
| 5,696,908 A | 12/1997 | Muehlberger et al. |
| 5,697,484 A | 12/1997 | Yeh |
| 5,699,328 A | 12/1997 | Ishizaki et al. |
| 5,704,049 A | 12/1997 | Briechle |
| 5,711,704 A | 1/1998 | Hughes et al. |
| 5,715,926 A | 2/1998 | Furneaux et al. |
| 5,732,398 A | 3/1998 | Tagawa |
| 5,743,429 A | 4/1998 | Morofsky |
| 5,745,706 A | 4/1998 | Wolfberg et al. |
| 5,746,299 A | 5/1998 | Molbak et al. |
| 5,746,322 A | 5/1998 | LaVeine et al. |
| 5,788,046 A | 8/1998 | Lamah et al. |
| 5,799,767 A | 9/1998 | Molbak |
| 5,799,768 A | 9/1998 | Bernier et al. |
| 5,806,651 A | 9/1998 | Carmen et al. |
| 5,839,956 A | 11/1998 | Takemoto et al. |
| 5,842,916 A | 12/1998 | Gerrity et al. |
| 5,868,236 A | 2/1999 | Rademacher |
| 5,875,110 A | 2/1999 | Jacobs |
| 5,880,444 A | 3/1999 | Shibata et al. |
| 5,898,383 A | 4/1999 | Forsythe |
| 5,901,828 A | 5/1999 | Monie et al. |
| 5,909,792 A | 6/1999 | Gerlier et al. |
| 5,909,793 A | 6/1999 | Beach et al. |
| 5,909,794 A | 6/1999 | Molbak et al. |
| 5,910,044 A | 6/1999 | Luciano, Jr. et al. |
| 5,929,366 A | 7/1999 | Kennedy |
| 5,931,277 A | 8/1999 | Allan et al. |
| 5,936,541 A | 8/1999 | Stambler |
| 5,941,363 A | 8/1999 | Partyka et al. |
| 5,957,262 A | 9/1999 | Molbak et al. |
| 5,974,146 A | 10/1999 | Randle et al. |
| 5,975,276 A | 11/1999 | Yeh |
| 5,988,345 A | 11/1999 | Bergeron et al. |
| 5,988,348 A | 11/1999 | Martin et al. |
| 5,991,413 A | 11/1999 | Arditti et al. |
| 5,995,927 A | 11/1999 | Li |
| 6,016,481 A | 1/2000 | Failing, Jr. et al. |
| 6,017,063 A | 1/2000 | Nilssen |
| 6,021,883 A | 2/2000 | Casanova et al. |
| 6,026,946 A | 2/2000 | McCarty, Jr. |
| 6,042,471 A | 3/2000 | Tanaka |
| 6,047,807 A | 4/2000 | Molbak |
| 6,047,808 A | 4/2000 | Neubarth et al. |
| 6,053,300 A | 4/2000 | Wood et al. |
| 6,053,807 A | 4/2000 | Metzger et al. |
| 6,056,104 A | 5/2000 | Neubarth et al. |
| 6,059,650 A | 5/2000 | Stoltz et al. |
| 6,068,550 A | 5/2000 | Breitholtz et al. |
| 6,071,187 A | 6/2000 | Knutsson et al. |
| 6,082,519 A | 7/2000 | Martin et al. |
| 6,093,094 A | 7/2000 | Uecker et al. |
| 6,095,313 A | 8/2000 | Molbak et al. |
| 6,095,916 A | 8/2000 | Tamaki |
| 6,105,009 A | 8/2000 | Cuervo |
| 6,110,044 A | 8/2000 | Stern |
| 6,116,402 A | 9/2000 | Beach et al. |
| 6,119,099 A | 9/2000 | Walker et al. |
| 6,138,106 A | 10/2000 | Walker et al. |
| 6,144,946 A | 11/2000 | Iwamura et al. |
| 6,168,001 B1 | 1/2001 | Davis |
| 6,174,230 B1 | 1/2001 | Gerrity et al. |
| 6,179,703 B1 | 1/2001 | Knutsson et al. |
| 6,185,545 B1 | 2/2001 | Resnick et al. |
| 6,196,371 B1 | 3/2001 | Martin et al. |
| 6,223,877 B1 | 5/2001 | McGinty et al. |
| 6,223,878 B1 | 5/2001 | Cattani et al. |
| 6,227,343 B1 | 5/2001 | Neathway et al. |
| 6,230,928 B1 | 5/2001 | Hanna et al. |
| 6,233,564 B1 | 5/2001 | Schulze, Jr. |
| 6,250,453 B1 | 6/2001 | Furuya |
| 6,253,179 B1 | 6/2001 | Beigi et al. |
| 6,253,809 B1 | 7/2001 | Paradies |
| 6,264,104 B1 | 7/2001 | Jenkins et al. |
| 6,289,324 B1 | 9/2001 | Kawan |
| 6,292,211 B1 | 9/2001 | Pena |
| 6,293,385 B1 | 9/2001 | Hayashi et al. |
| 6,318,536 B1 | 11/2001 | Korman et al. |
| 6,349,972 B1 | 2/2002 | Geiger et al. |
| 6,375,080 B1 | 4/2002 | Cremonese |
| 6,398,001 B1 | 6/2002 | Hutchinson et al. |
| 6,398,637 B1 | 6/2002 | Tsuchida |
| 6,401,010 B1 | 6/2002 | Takahashi |
| 6,404,090 B1 | 6/2002 | Phillips et al. |
| 6,405,182 B1 | 6/2002 | Cuervo |
| 6,415,262 B1 | 7/2002 | Walker et al. |
| 6,471,030 B1 | 10/2002 | Neubarth et al. |
| 6,484,863 B1 | 11/2002 | Molbak |
| 6,484,864 B2 | 11/2002 | Sugata |
| 6,484,884 B1 | 11/2002 | Gerrity et al. |
| 6,494,776 B1 | 12/2002 | Molbak |
| 6,505,774 B1 | 1/2003 | Fulcher et al. |
| 6,520,308 B1 | 2/2003 | Martin et al. |
| 6,536,037 B1 | 3/2003 | Guheen et al. |
| 6,554,184 B1 | 4/2003 | Amos |
| 6,607,063 B2 | 8/2003 | Kuwabara et al. |
| 6,666,318 B2 | 12/2003 | Gerrity et al. |
| 6,704,039 B2 | 3/2004 | Pena |
| 6,705,448 B1 | 3/2004 | Steel et. al. |
| 6,725,630 B2 | 4/2004 | Rea et al. |
| 6,736,251 B2 | 5/2004 | Molbak |
| 6,739,444 B2 | 5/2004 | Baker et al. |

(56) References Cited

U.S. PATENT DOCUMENTS

| | | |
|---|---|---|
| 6,758,316 B2 | 7/2004 | Molbak |
| 6,761,257 B2 | 7/2004 | Karlsson |
| 6,766,892 B2 | 7/2004 | Martin et al. |
| 6,778,693 B2 | 8/2004 | Munro et al. |
| 6,817,052 B2 | 11/2004 | Grube |
| 6,829,596 B1 | 12/2004 | Frazee |
| 6,830,143 B2 | 12/2004 | King |
| 6,854,581 B2 | 2/2005 | Molbak |
| 6,863,168 B1 | 3/2005 | Gerrity et al. |
| 6,886,680 B2 | 5/2005 | King |
| 6,899,215 B2 | 5/2005 | Baudat et al. |
| 6,902,049 B2 | 6/2005 | King |
| 6,957,746 B2 | 10/2005 | Martin et al. |
| 6,976,570 B2 | 12/2005 | Molbak |
| 7,000,754 B2 | 2/2006 | Baudat et al. |
| 7,014,029 B2 | 3/2006 | Winters |
| 7,014,108 B2 | 3/2006 | Sorenson et al. |
| 7,017,729 B2 | 3/2006 | Gerrity et al. |
| 7,028,827 B1 | 4/2006 | Molbak et al. |
| 7,044,285 B2 | 5/2006 | Takebayashi |
| 7,073,652 B2 | 7/2006 | Baudat |
| 7,113,929 B1 | 9/2006 | Beach et al. |
| 7,131,580 B2 | 11/2006 | Molbak |
| 7,152,727 B2 | 12/2006 | Waechter |
| 7,198,157 B2 | 4/2007 | King et al. |
| 7,213,697 B2 | 5/2007 | Martin et al. |
| 7,243,772 B2 | 7/2007 | Harris et al. |
| 7,290,645 B2 | 11/2007 | Hill et al. |
| 7,303,119 B2 | 12/2007 | Molbak |
| 7,520,374 B2 | 4/2009 | Martin et al. |
| 7,527,193 B2 | 5/2009 | Molbak |
| 7,539,616 B2 | 5/2009 | Zhang et al. |
| 7,549,526 B2 | 6/2009 | Ohtomo |
| 7,552,810 B2 | 6/2009 | Mecklenburg |
| 7,558,765 B2 | 7/2009 | Kiefer |
| 7,584,833 B2 | 9/2009 | Howells |
| 7,584,869 B2 | 9/2009 | DeLazzer et al. |
| 7,646,894 B2 | 1/2010 | Yang et al. |
| 7,653,599 B2 | 1/2010 | Doran et al. |
| 7,658,668 B2 | 2/2010 | Hill |
| 7,708,130 B2 | 5/2010 | Meyer et al. |
| 7,748,619 B2 | 7/2010 | Martin et al. |
| 7,773,784 B2 | 8/2010 | Boult |
| 7,815,071 B2 | 10/2010 | Martin et al. |
| 7,865,432 B2 | 1/2011 | Doran et al. |
| 7,874,478 B2 | 1/2011 | Molbak |
| 7,971,699 B2 | 7/2011 | Molbak et al. |
| 8,024,272 B2 | 9/2011 | Doran et al. |
| 8,073,287 B1 | 12/2011 | Wechsler et al. |
| 8,490,771 B2 | 7/2013 | Toji |
| 8,517,161 B2 | 8/2013 | Baudat |
| 8,550,227 B1 | 10/2013 | Martin |
| 8,611,665 B2 | 12/2013 | He et al. |
| 8,668,069 B1 | 3/2014 | Everhart |
| 8,739,955 B1 | 6/2014 | Everhart |
| 8,899,401 B2 | 12/2014 | Everhart |
| 2001/0008200 A1 | 7/2001 | Yoshida et al. |
| 2001/0013456 A1 | 8/2001 | Ishida et al. |
| 2002/0026423 A1 | 2/2002 | Maritzen et al. |
| 2003/0057054 A1 | 3/2003 | Waechter |
| 2003/0215141 A1* | 11/2003 | Zakrzewski et al. .......... 382/190 |
| 2004/0120567 A1* | 6/2004 | Takahashi ................. 382/136 |
| 2004/0129528 A1* | 7/2004 | Takebayashi ............... 194/328 |
| 2006/0025062 A1 | 2/2006 | Masen et al. |
| 2007/0154078 A1 | 7/2007 | He et al. |
| 2009/0159395 A1 | 6/2009 | Gerrity et al. |
| 2009/0166151 A1 | 7/2009 | Martin et al. |
| 2010/0054551 A1* | 3/2010 | Decoux ...................... 382/124 |
| 2010/0330892 A1 | 12/2010 | Nishida |
| 2011/0042403 A1 | 2/2011 | Martin |
| 2011/0195649 A1 | 8/2011 | Abe et al. |
| 2011/0259709 A1 | 10/2011 | Grossmann |
| 2013/0074322 A1 | 3/2013 | Maute |
| 2013/0086973 A1 | 4/2013 | Martin et al. |

FOREIGN PATENT DOCUMENTS

| | | |
|---|---|---|
| AU | 753323 B2 | 10/2002 |
| AU | 777507 B2 | 10/2004 |
| AU | 2005200256 A1 | 2/2005 |
| CA | 1053598 | 5/1979 |
| CA | 2060630 | 8/1992 |
| CA | 2067987 | 11/1992 |
| CA | 2143943 A1 | 3/1994 |
| CA | 2189330 A1 | 11/1995 |
| CA | 2235925 A1 | 11/1995 |
| CA | 2259234 A1 | 1/1998 |
| CA | 2426411 A1 | 1/1998 |
| CA | 2426462 A1 | 1/1998 |
| CA | 2295129 A1 | 1/1999 |
| CA | 2581740 A1 | 1/1999 |
| CH | 680171 | 6/1992 |
| DE | 660354 C | 5/1938 |
| DE | 1944488 | 3/1971 |
| DE | 2516532 | 10/1975 |
| DE | 2528735 A1 | 4/1976 |
| DE | 2800494 | 7/1979 |
| DE | 3021327 A1 | 12/1981 |
| DE | 3147603 | 6/1983 |
| DE | 288018 A5 | 3/1991 |
| EP | 0060392 A2 | 9/1982 |
| EP | 0076617 A2 | 4/1983 |
| EP | 0091731 | 10/1983 |
| EP | 0164733 A2 | 12/1985 |
| EP | 0200873 | 11/1986 |
| EP | 0209357 | 1/1987 |
| EP | 0300781 | 1/1989 |
| EP | 0304535 | 3/1989 |
| EP | 0 351 217 | 1/1990 |
| EP | 0420163 A1 | 4/1991 |
| EP | 0455200 A2 | 11/1991 |
| EP | 0477722 | 4/1992 |
| EP | 0657855 | 6/1995 |
| EP | 0685826 | 12/1995 |
| EP | 0710932 A1 | 5/1996 |
| EP | 0724237 | 7/1996 |
| EP | 0766859 A1 | 4/1997 |
| EP | 0857579 A2 | 8/1998 |
| EP | 0924664 A2 | 6/1999 |
| EP | 0924664 | 6/1999 |
| EP | 0924665 A2 | 6/1999 |
| EP | 1178448 | 2/2002 |
| EP | 1231579 | 8/2002 |
| EP | 1646014 A2 | 4/2006 |
| EP | 1939821 A1 | 7/2008 |
| EP | 1956563 A1 | 8/2008 |
| EP | 2045780 A1 | 4/2009 |
| EP | 2360649 A1 | 8/2011 |
| FR | 2042254 A5 | 2/1971 |
| FR | 2342531 A1 | 9/1977 |
| FR | 2845189 | 4/2004 |
| GB | 807880 A | 1/1959 |
| GB | 958741 | 5/1964 |
| GB | 1255492 A | 12/1971 |
| GB | 1564723 | 4/1980 |
| GB | 2079846 A | 1/1982 |
| GB | 2095452 | 9/1982 |
| GB | 2121582 A | 12/1983 |
| GB | 2130299 A | 5/1984 |
| GB | 2153128 A | 8/1985 |
| GB | 2169429 | 7/1986 |
| GB | 2175427 A | 11/1986 |
| GB | 2186411 A | 8/1987 |
| GB | 2188467 | 9/1987 |
| GB | 2198274 A | 6/1988 |
| GB | 2223340 A | 4/1990 |
| GB | 2223872 A | 4/1990 |
| GB | 2225918 A | 6/1990 |
| GB | 2237912 A | 5/1991 |
| GB | 2255666 A | 11/1992 |
| GB | 2272319 A | 5/1994 |
| GB | 2341710 A | 3/2000 |
| GB | 2341711 A | 3/2000 |
| GB | 2344446 A | 6/2000 |

(56) References Cited

FOREIGN PATENT DOCUMENTS

| | | |
|---|---|---|
| GB | 2356966 A | 6/2001 |
| GB | 2357885 A | 7/2001 |
| GB | 2357886 A | 7/2001 |
| GB | 2358271 A | 7/2001 |
| GB | 2358272 A | 7/2001 |
| GB | 2358273 A | 7/2001 |
| JP | 53049497 | 5/1978 |
| JP | 55-159467 | 12/1980 |
| JP | 58-121491 | 7/1983 |
| JP | 59-148709 | 8/1984 |
| JP | 0097469 | 5/1985 |
| JP | 61-065572 | 4/1986 |
| JP | 62-50876 | 3/1987 |
| JP | 63-4390 | 1/1988 |
| JP | 1258092 A | 10/1989 |
| JP | 1307891 A | 12/1989 |
| JP | 2081193 | 3/1990 |
| JP | 3-63795 | 3/1991 |
| JP | 392994 | 4/1991 |
| JP | 3252795 A | 11/1991 |
| JP | 0433194 | 2/1992 |
| JP | 4-67776 | 6/1992 |
| JP | 4315288 A | 11/1992 |
| JP | 4344995 | 12/1992 |
| JP | 5249892 A | 9/1993 |
| JP | 5250296 A | 9/1993 |
| JP | 07306976 | 11/1995 |
| JP | 2000163587 A | 6/2000 |
| JP | 200351043 | 9/2004 |
| JP | 2009-211207 A | 9/2009 |
| JP | 2009294693 A | 12/2009 |
| JP | 2011248775 A | 12/2011 |
| JP | 5-200364 B2 | 6/2013 |
| JP | 5200364 | 6/2013 |
| JP | 54-57921 B2 | 4/2014 |
| KR | 10-2007-0106819 | 11/2007 |
| MX | 9605331 A | 12/1997 |
| NZ | 333535 A | 8/2000 |
| SE | 44244 | 9/1918 |
| SE | 44247 | 9/1918 |
| SE | 50250 | 11/1919 |
| SE | 8801851 A | 11/1989 |
| WO | WO-8700102 A1 | 1/1987 |
| WO | WO-8705729 | 9/1987 |
| WO | WO-8800274 A2 | 1/1988 |
| WO | WO-8800592 A1 | 1/1988 |
| WO | WO-8808174 | 10/1988 |
| WO | WO-8901209 | 2/1989 |
| WO | WO-9100209 A1 | 1/1991 |
| WO | WO-9302431 | 2/1993 |
| WO | WO-9307846 A1 | 4/1993 |
| WO | WO-9406101 A1 | 3/1994 |
| WO | WO-9409440 A1 | 4/1994 |
| WO | WO-9505356 A1 | 2/1995 |
| WO | WO-95/30215 | 11/1995 |
| WO | WO-96/30877 | 10/1996 |
| WO | WO-9707485 A1 | 2/1997 |
| WO | WO-97/33257 | 9/1997 |
| WO | WO-9949423 A1 | 9/1999 |
| WO | WO-9950785 | 10/1999 |
| WO | WO-0010138 | 2/2000 |
| WO | WO-2008024043 A1 | 2/2008 |

OTHER PUBLICATIONS

Konrad Schindler, "Geometry and Construction of Straight Lines in Log-polar Images", 2006, Computer Vision and Understanding, 103, pp. 196-207.*
Erhard Schubert and Markus Becker, "A Vision Based Coin Inspection System", 1996, SPIE vol. 2908, pp. 86-96.*
International Search Report and Written Opinion for PCT Application No. PCT/US2013/040704, Mail Date Aug. 27, 2013, 12 pages.
"Input Capture/Output Compare Combination in PIC24FJ64GB002 Problems," Microship.com [online], May 6, 2011, Retrieved from the Internet: URL: http://www.microchip.com/forums/m576742.aspx, 4 pages.
Hoffman, Douglas, "Test Automation Architectures: Planning for Test Automation," Software Quality Methods, LLC, 1999, 8 pages.
U.S. Appl. No. 09/035,273, filed Mar. 9, 1988, Molbak et al.
U.S. Appl. No. 09/225,774, filed Jan. 4, 1999, Molbak et al.
"Covariance Matrix," Wikipedia, [Online], Dec. 7, 2012 at 01:03 [Retrieved Aug. 7, 2013], Retrieved from the Internet: URL: http://en.wikipedia.org/w/index.php?title=Covariance_matrix&oldid=526797194, 5 pages.
"Definitions of Multivariate Statistics on the Web," Google [Online], 2006 [Retrieved Dec. 23, 2006], Retrieved from the Internet: URL: http://www.google.com/search?hl+en&q+define%3A+multivariate+statistics, 1 page.
"How to Interpret an Inverse Covariance or Precision Matrix?" CrossValidated, [Online] Posted Nov. 8, 2011 [Retrieved Aug. 7, 2013] Retrieved from the Internet: URL: http://stats.stackexchange.com/questions/10795/how-to-interpret-an-inverse-covariance-or-precision-matrix, 2 pages.
"The Electrical Engineering Handbook", 2nd Ed. Published by CRC Press and IEEE in 1997, Edited by Richard C. Dorf, pp. 23-31.
"Worked Example, a Cylinder Rolling Down a Slope," University of Cambridge Department of Applied Mathematics and Theoretical Physics [Online], undated, 2 pages.
Accessories Brochure, Jun. 16, 2005, 3 pages.
Answer To Amended Complaint for Patent Infringement And Counterclaim for Declaratory Judgment; Case No. C-97 20536 E.I.; United States District Court, Northern District of California, San Jose Division; filed Nov. 2, 1998.
Baker, M. J., "Maths—Matrix Arithmetic," Euclideanspace.com [Online], 1998-2006 [Retrieved on Dec. 23, 2006], Retrieved from the Internet: URL: http://www.euclideanspace.com/maths/algebra/matrix/arithmetic/index.htm, 4 pages.
Bedienungsanleitung CDS 500/MCC 500, 1991, 9 pages.
Carey, G., "Multivariate Analysis of Variance (MANOVA): I. Theory," [Online], 1998, [Retrieved on Aug. 7, 2013], Retrieved from the Internet: URL: http://ibgwww.colorado.edu/~carey/p7291dir/handouts/manova1.pdf, 14 pages.
Cash, M., "Bank Blends New Technology with Service", Winnipeg Free Press, Sep. 4, 1992, 1 page.
CDS Automated Receipt Giving Cash Deposit System, Case-ICC Limited, Dec. 22, 2006, 3 pages.
Cohen, P., "Coinstar Turns Loose Change into iTunes Songs," Yahoo News, http://news.yahoo.com/s/macworld/20060410/tc_macworld/coinstar20060410_0, Apr. 10, 2006, pp. 1-3.
CoinBank Automated Systems, Inc.'s Initial Disclosure of Prior Art Pursuant to Local Rule 16-7, Case No. C-97 20536 EAI, Nov. 20, 1997.
Coinbank Automated Systems, Inc.'s Response to Coinstar Inc.'s Third Set of Interrogatories; *Coinstar, Inc.* v. *Coinbank Automated Systems, Inc.*; Case No. C-97 20536 EAI; United States District Court for the Northern District of California, San Jose Division; filed Mar. 15, 1999.
*Coinstar* v. *CoinBank Automated Systems, Inc.*; Case No. C-97 20536 E.I.; United States District Court, Northern District of California, San Jose Division; Defendant's Notice of Motion and Motion for Summary Judgment or Summary Adjudication of Issues; and Memorandum of Points and Authorities in Support Thereof and attachments; filed Jun. 7, 1999.
Correspondence between Scan Coin and Coinstar, Jan. 7, 1992, 2 pages. Not Available.
F. Zimmerman & Co., "Reference Manual Contovit/Sortovit, Perconta Money Counting and Sorting Systems," Aug. 1995, pp. I-III, 1-31, and three pages of specifications.
Facsimile from Claes Breitholtz of Scan Coin AB to Aaron Finch of Coinstar, Inc., apparently transmitted on Feb. 8, 1996, 4 pages.
Flury, B., *A First Course in Multivariate Statistics*, Springer Texts in Statistics, 1997, pp. 279-297, 20 pages.
Fri Kopenskap articles, Mar. 18, 1988, Apr. 27, 1989 and Nov. 25, 1988, 6 pages.
Geldinstitute Literature, Mar. 1990 and Apr.-May 1992, 2 pages.
Hamilton, Martha M., "Turning Cans into Cold Cash", The Washington Post, Jul. 2, 1991, pp. D1, D4, pp. 194-209.

(56) References Cited

OTHER PUBLICATIONS

Infromation Disclosure Satement Recieved by the UPSTO on Dec. 18, 2006 in U.S. Appl. No. 10/670,111.
Information Disclosure Statement Recieved by the UPSTO on Feb. 17, 2004 in U.S. Appl. No. 10/670,111.
Kundenselbstbedienung, Dec. 22, 2006, 4 pages.
Kunderna fixar vaxeln, Praktiska, Dec. 12, 2006, 2 pages.
Leitch, C., "High-tech bank counts coins," Innovations, Report on Business, Sep. 18, 1991, 1 pages.
Liemeon, J., "Royal's Burlington drive-in bank provides customers 24-hour tellers," *Business Today, The Toronto Star*, Aug. 21, 1991, 1 page.
NCR, "NCR 7800 Consumer Price Verifier," http://www3.ncr.com/product/retail/product/catalog/7800.shtml, accessed Mar. 18, 1999, 2 pages.
Newspaper Articles, Sep. 18, 1991.
Order Granting Counter-Defendant's (1) Motion To Dismiss Counterclaim For Declaratory Judgement Based On Unenforceability And (2) Motion To Strike Inequitable Conduct Affirmative Defense, Ordered Sep. 8, 1997, No. C97-20536 EAI.
Oxby, M., "Royal Bank opens 'Super Branch,'" The Gazette Montreal, Sep. 14, 1991, 1 page.
Reis Eurosystems Geldbearbeitungssysteme, "Test-Programme CS 3110 Selectronic Coin Sorting and Counting Machine", Jul. 1992, 5 pages.
Reis Eurosystems, "Operating Instructions CS 3110 Selectronic Coin Sorting and Counting Machine With Central Sensor", Jul. 1992, 10 pages.
SC4000 Coin Discriminating System, Including Perforated, Vibrating Coin Feeding and Cleaning Tray Assembly; On sale in the US by Scan Coin Since at least 12/94 (including photographs, drawings and parts lists), 92 pages.
Scan Coin 102 Value Counter, Brochure, Undated, 2 pages.
Scan Coin 4000 Value Sorter Brochure—Published 1994, 5 pages.
Scan Coin 4000 Value Sorter, Operators Instruction Manual, Jun. 1995, 56 pages.
Scan Coin AB's Answers to Coinbank's First Set of Interrogatories (Nos. 1-13), executed on Nov. 3, 1997.
Scan Coin AB, "Scan Coin 4000 Value Sorter" and product photos, on sale in the U.S. prior to Sep. 2001, 11 pages.
Scan Coin AB, 1989, Jagershillgatan 26, S-213, 75 Malmo, Sweden, Technical Referens Manual, CDS Coin Deposit System, 47 pages.
Scan Coin CDS 600 Cash Deposit System, Brochure, Jun. 15, 1994, 2 pages.
Scan Coin CDS 640 Cash Deposit System Brochure, published at least by May 12, 2006, 2 pages.
Scan Coin CDS Brochure, Sep. 1988, 6 pages.
Scan Coin CDS Mini Cash Deposit System, Brochure, Undated, 2 pages.
Scan Coin CDS Munzgeldeinzahlungen in Selbstbedienung: Cash Deponier System CDS 500, 1994, 6 pages.
Scan Coin correspondence regarding supermarkets, Sep. 11, 1992, 4 pages.
Scan Coin International Report, Apr. 1987, 49 pages.
Scan Coin Money Processing Systems, Oct. 1, 1988, 9 pages.
Scan Coin Newsletter, May 1991, 2 pages.
Scan Coin Newsletters.
Scan Coin Sales Invoices for Coin Counters in the United States, 1989-1993, 29 pages.
Scan Coin SC4000 Operating Instructions, dated Aug. 10, 1994, 6 pages.
Scan Coin Technical Manual CDS MK 1 Coin Deposit System; 1991, 98 pages.
Scan Coin Technical Manual SC 102 Value Counter, Available prior to Jul. 2011, 28 pages.
Scan Coin Technical Manual SC4000, dated Jul. 29, 1994, 12 pages.
Scan Coin Technical Reference Manual CDS Coin Deposit System (odd pages only) 1989, 47 pages. Duplicate.
Scan Coin User's Manual, CDS 600, 1991, 14 pages.
Scan Coin User's Manual, CDS 640, 1988, 7 pages.
Scan Coin World Newsletters, Scan Coin AB, Jagerhillgatan 26, S-213 75 Malmo, Sweden, 1988-1990, 6 pages.
Second Amended and Supplemental Answer to Complaint for Patent Infringement and Counterclaim for Declaratory Judgement, Dated Sep. 27, 1997, Case No. C-97 20536 EAI.
Sheehan, Michael, "Marriage of Convenience," available at <http://www.kioskbusiness.com/NovDec01/articles/article4.html>, accessed May 19, 2003, 3 pages.
Simmons, B, "Inverse of a Matrix, Matrix Inverse, Multiplicative Inverse of a Matrix," www.mathwords.com [Online], Aug. 27, 2012 [Retrieved Aug. 7, 2013], Retrieved from the Internet: URL: http://www.mathwords.com/i/inverse_of_a_matrix.htm, 2 pages.
Slide Changing Apparatus With Slide Jam Protection, Research Disclosure 30509, Sep. 1989, 3 pages.
Stapel, E, "Matrix Inversion: Finding the Inverse of a Matrix," Purplemath [Online], 2003-2012 [Retrieved on Dec. 19, 2012], Retrieved from the Internet: URL: http://www.purplemath.com/modules/mtrxinvr.htm, 2 pages.
Super Branch Literature, Feb. 1992, 2 pages.
Svenska Penninglotteriet Documents, 1988, 70 pages.
Technical Manual, Cash Deposit System, Model CDS 600 & CDS 640, 1991, 46 pages.
Technical Specifications GBS9401 SB, Prior to Nov. 10, 2010, 24 pages.
Wennergren-Williams, "Who Wants a Computer Consultant Who Thinks the Same Way as Everyone Else?" Priab Prisma, vol. 1, 1989, 7 pages.
Japanese Office Action for Japanese Application No. 2013-213549, Mail Date Aug. 11, 2014, 15 pages.

* cited by examiner

OPTICAL COIN DISCRIMINATION SYSTEMS AND METHODS FOR USE WITH CONSUMER-OPERATED KIOSKS AND THE LIKE

TECHNICAL FIELD

The present technology is generally related to the field of consumer-operated kiosks and, more particularly, to the field of coin discrimination.

BACKGROUND

Various embodiments of consumer-operated coin counting kiosks are disclosed in, for example: U.S. Pat. Nos. 5,620,079, 6,494,776, 7,520,374, 7,584,869, 7,653,599, 7,748,619, 7,815,071, and 7,865,432; and U.S. patent application Ser. Nos. 12/758,677, 12/806,531, 61/364,360, and 61/409,050; each of which is incorporated herein in its entirety by reference.

Many consumer-operated kiosks, vending machines, and other commercial sales/service/rental machines discriminate between different coin denominations based on the size, weight and/or electromagnetic properties of metal alloys in the coin. With some known technologies, a coin can be routed through an oscillating electromagnetic field that interacts with the coin. As the coin passes through the electromagnetic field, coin properties are sensed, such as changes in inductance (from which the diameter of the coin can be derived) or the quality factor related to the amount of energy dissipated (from which conductivity/metallurgy of the coin can be obtained). The results of the interaction can be collected and compared against a list of sizes and electromagnetic properties of known coins to determine the denomination of the coin. In other known technologies, a coin can be rolled along a predetermined path and the velocity of the coin or the time to reach a certain point along the path can be measured. The measured velocity or time is a function of the acceleration of the coin which, in turn, depends on the mass and diameter of the coin. By comparing the measured time or velocity against the corresponding values for known coins, the denomination of the coin can be determined.

However, many coins may have similar size, mass, and/or metallurgy. This is especially the case for consumer-operated kiosks in markets which are proximate to multiple countries having different coin denominations. As a result, coin counting mistakes may occur due to the similarities in coin size, mass, and/or metallurgy, resulting in possible losses for the kiosk operator. Accordingly, it would be advantageous to provide robust coin discrimination systems and methods that would work reliably for coins having similar size, mass, and/or metallurgy.

DETAILED DESCRIPTION

The following disclosure describes various embodiments of systems and associated methods for discriminating coin denominations based on optical properties of the coins. In embodiments of the present invention, a consumer-operated kiosk (e.g., a consumer coin counting machine, prepaid card dispensing/reloading machine, etc.) includes a digital camera that can acquire a digital image of a coin when the coin enters the viewfield of the camera. The face or back side of a typical coin has numerous optical features that can be used in discriminating the coin. The outer edge of the coin can be detected using line detection algorithms including, for example, Canny edge detection. Once the outline of the coin is determined, the diameter of the coin can be calculated and used to discriminate the coins. Additionally, a spectral analysis of the digital image of the coin can be performed to generate further discriminating aspects of the coins. Since a rectangular domain is generally better suited for spectral analysis than a round domain, the digital image of a round coin can be mapped into a rectangular domain using, for example, a log-polar transform. In some embodiments, a Fourier or other spectral transform can be performed on the rectangular domain to generate a spectral plot of the coin. Different types of coins produce varying spectral peaks at different locations. The values and locations of the peaks in the spectral plot can be used as additional coin discriminating aspects. One or more aspects of the coins can then be compared with known values for different coins to determine the correct denomination of a coin. The coin can be properly credited or rejected by the consumer-operated kiosk based on the discrimination results.

The following disclosure describes various embodiments of coin counting systems and associated methods of manufacture and use. Certain details are set forth in the following description and FIGS. 1A-15 to provide a thorough understanding of various embodiments of the disclosure. Other details describing well-known structures and systems often associated with coin counting machines, however, are not set forth below to avoid unnecessarily obscuring the description of the various embodiments of the disclosure. Many of the details and features shown in the Figures are merely illustrative of particular embodiments of the disclosure. Accordingly, other embodiments can have other details and features without departing from the spirit and scope of the present disclosure. In addition, those of ordinary skill in the art will understand that further embodiments can be practiced without several of the details described below. Furthermore, various embodiments of the disclosure can include structures other than those illustrated in the Figures and are expressly not limited to the structures shown in the Figures. Moreover, the various elements and features illustrated in the Figures may not be drawn to scale.

Figure 1A:
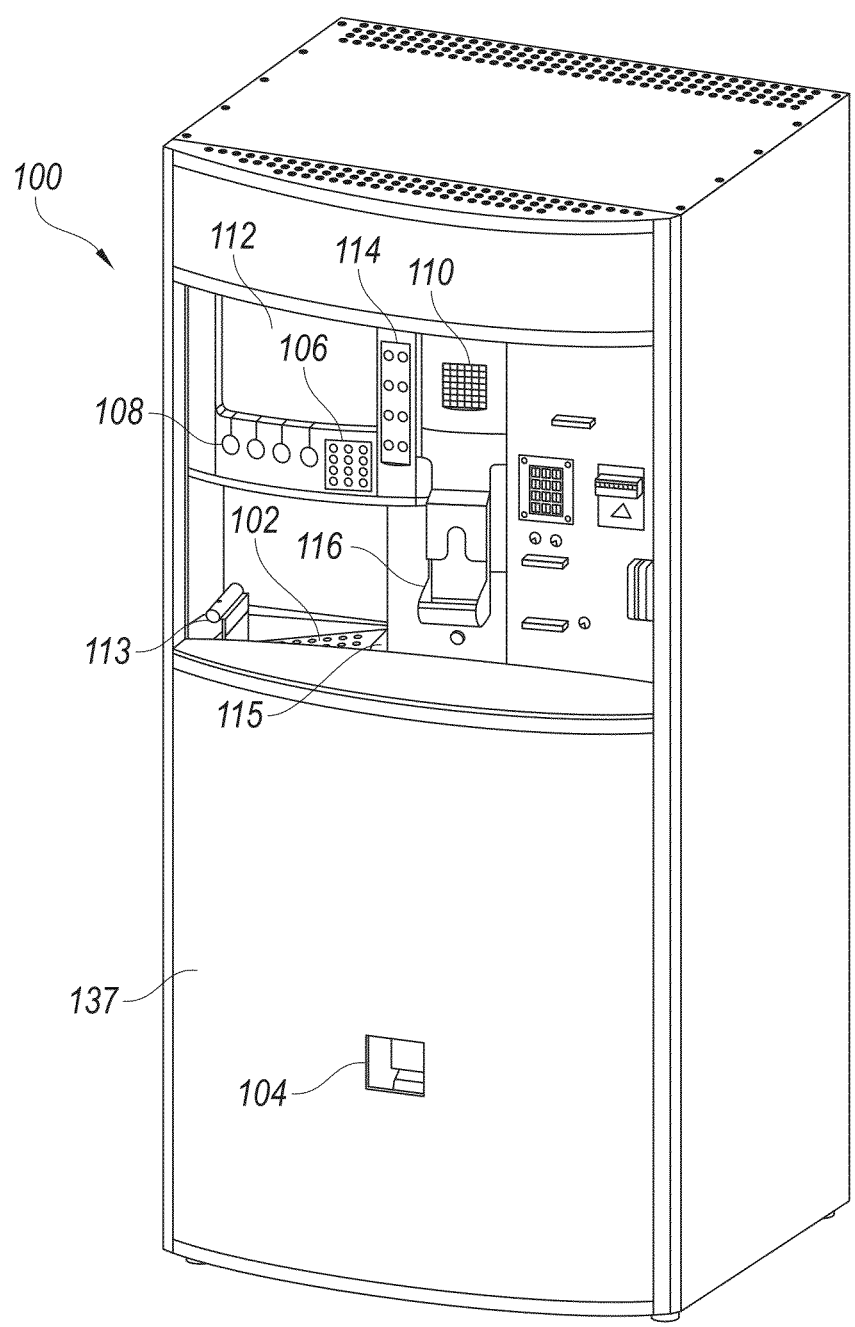
FIG. 1A is a front isometric view of a consumer-operated coin counting kiosk suitable for implementing embodiments of the present technologies.

FIG. 1A is an isometric view of a consumer coin counting machine 100 configured in accordance with an embodiment of the present disclosure. In the illustrated embodiment, the coin counting machine 100 includes a coin input region or tray 102 and a coin return 104. The tray 102 includes a lift handle 113 for moving the coins into the machine 100 through an opening 115. The machine 100 further includes various user-interface devices, such as a keypad 106, user-selection buttons 108, a speaker 110, a display screen 112, a touch screen 114, and a voucher outlet 116. In other embodiments, the machine 100 can have other features in other arrangements including, for example, a card reader, a card dispenser, etc. Additionally, the machine 100 can include various indicia, signs, displays, advertisements and the like on its external surfaces. The machine 100 and various portions, aspects and features thereof can be at least generally similar in structure and function to one or more of the machines described in U.S. Pat. No. 7,520,374, U.S. Pat. No. 7,865,432, and/or U.S. Pat. No. 7,874,478, each of which is incorporated herein by reference in its entirety.

Figure 1B:
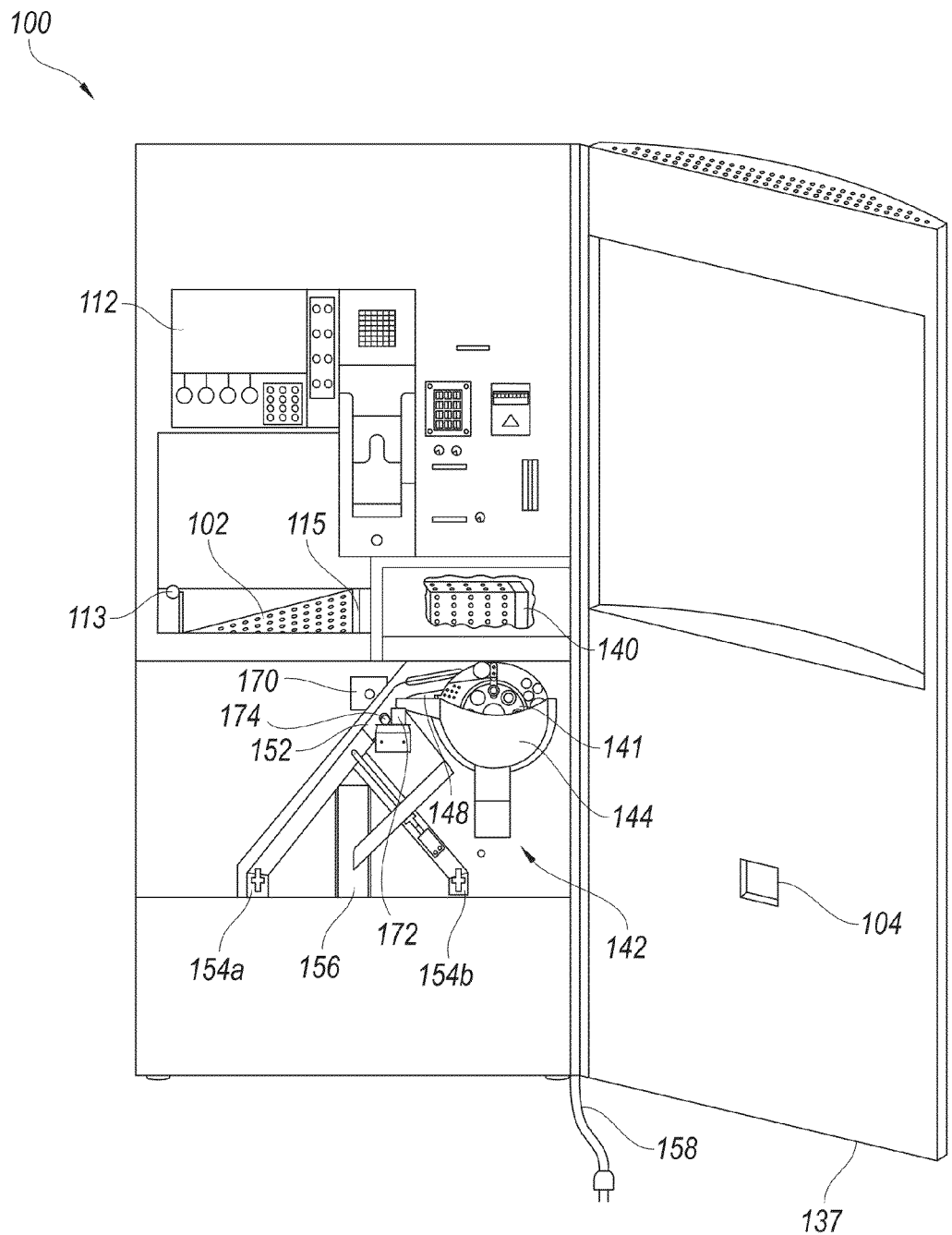
FIG. 1B is a front isometric view of the consumer-operated coin counting kiosk of FIG. 1A with a front door opened to illustrate a portion of the kiosk interior.

FIG. 1B is a partially cutaway isometric view of an interior portion of the machine 100. The machine 100 includes a door 137 that can rotate to an open position as shown. In the open position, most or all of the components of the machine 100 are accessible for cleaning and/or maintenance. In the illustrated embodiment, the machine 100 includes a coin cleaning portion (e.g., a trommel 140) and a coin counting portion 142. As described in more detail below, coins that are deposited into the tray 102 are directed through the trommel 140, and then to the coin counting portion 142. The coin counting portion 142 can include a coin rail 148 that receives coins from a coin hopper 144 via a coin pickup assembly 141. A power cord 158 can provide power to the machine 100.

In operation, a user places a batch of coins, typically of a plurality of denominations (and potentially accompanied by dirt or other non-coin objects and/or foreign or otherwise non-acceptable coins) in the input tray 102. The user is prompted by instructions on the display screen 112 to push a button indicating that the user wishes to have the batch of coins discriminated. An input gate (not shown) opens and a signal prompts the user to begin feeding coins into the machine by lifting the handle 113 to pivot the tray 102, and/or manually feeding coins through the opening 115. Instructions on the screen 112 may be used to tell the user to continue or discontinue feeding coins, to relay the status of the machine 100, the amount of coins counted thus far, and/or to provide encouragement, advertising, or other messages.

One or more chutes (not shown) direct the deposited coins and/or foreign objects from the tray 102 to the trommel 140. The trommel 140 in the depicted embodiment is a rotatably mounted container having a perforated-wall. A motor (not shown) rotates the trommel 140 about its longitudinal axis. As the trommel rotates, one or more vanes protruding into the interior of the trommel 140 assist in moving the coins in a direction towards an output region. An output chute (not shown) directs the (at least partially) cleaned coins exiting the trommel 140 toward the coin hopper 144.

Figure 2:
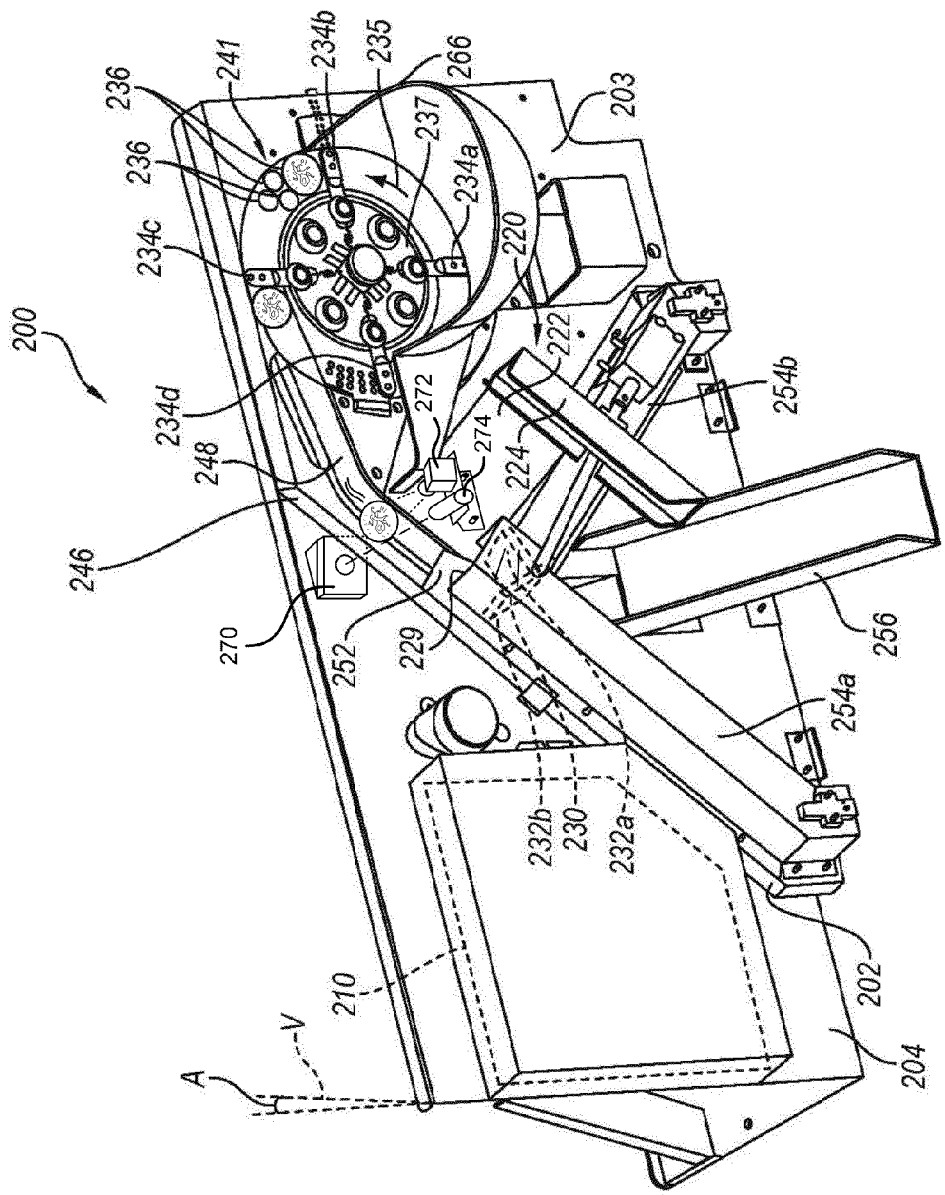
FIG. 2 is an enlarged front isometric view of a coin counting system of the kiosk of FIG. 1A.

FIG. 2 is an enlarged isometric view of the coin counting portion 142 of the coin counting machine 100 of FIG. 1 illustrating certain features in more detail. Certain components of the coin counting portion 142 can be at least generally similar in structure and function to the corresponding components described in U.S. Pat. No. 7,520,374. The coin counting portion 142 includes a base plate 203 mounted on a chassis 204. The base plate 203 can be disposed at an angle A with respect to a vertical line V from about 0° to about 15°. The angle A encourages coins in the hopper 266 to lay flat, such that the face of a given coin is generally parallel with the base plate 203. A circuit board 210 for controlling operation of various coin counting components can be mounted on the chassis 204.

The illustrated embodiment of the coin counting portion 142 further includes a coin pickup assembly 241 having a rotating disk 237 disposed in the hopper 266 and a plurality of paddles 234a-234d. The coin rail 248 extends outwardly from the disk 237, past a sensor assembly having a source of light 274 and a detector 270, a digital camera 272, and further toward a chute inlet 229. A bypass chute 220 includes a deflector plane 222 proximate the sensor assembly and configured to deliver oversized coins to the return chute 256. A diverting door 252 is disposed proximate the chute entrance 229 and is configured to selectively direct discriminated coins toward coin tubes 254a-b. A flapper 230 is operable between a first position 232a and a second position 232b to selectively direct coins to the first delivery tube 254a or the second delivery tube 254b, respectively.

In operation of the coin counting portion 200, the rotating disk 237 rotates in the direction of arrow 235, causing the paddles 234 to lift individual coins 236 from the hopper 266 and place them on the rail 248. The coins 236 travel along the rail 248 and further pass the digital camera 272. Coins that are larger than a preselected size parameter (e.g., a certain diameter) are directed to the deflector plane 222, into a trough 224, and then to the return chute 256. Coins within the acceptable size parameters pass through the digital image acquisition system described below with reference to FIG. 3. The associated software determines if the coin is one of a group of acceptable coins and, if so, the coin denomination is counted.

The majority of undesirable foreign objects (dirt, non-coin objects, etc.) are separated from the coin counting process by the coin cleaning portion or the deflector plane 222. However, coins or foreign objects of similar characteristics to desired coins are not separated by the hopper 266 or the deflector plane 222, and can pass through the coin sensor (described below with reference to FIG. 3). The coin sensor and the diverting door 252 operate to prevent unacceptable coins (e.g., foreign coins), blanks, or other similar objects from entering the coin tubes 254 and being kept in the machine 100. Specifically, in the illustrated embodiment, the coin sensor determines if an object passing through the sensor is a desired coin, and if so, the coin is "kicked" by the diverting door 252 toward the chute inlet 229. The flapper 230 is positioned to direct the kicked coin to one of the coin chutes 254. Coins that are not of a desired denomination, or foreign objects, continue past the coin sensor to the return chute 256.

Figure 3:
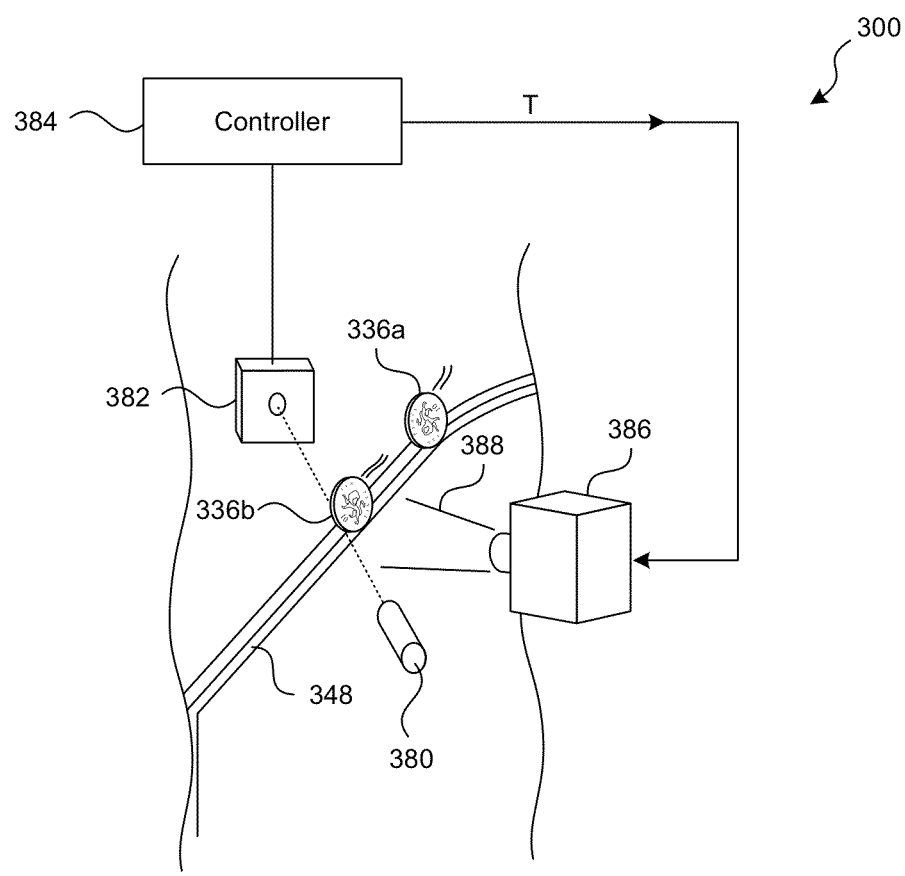
FIG. 3 is a schematic view of a digital image acquisition system configured in accordance with an embodiment of the present technology.

FIG. 3 is a partially schematic isometric view of a digital image acquisition system configured in accordance with an embodiment of the present technology. In the illustrated embodiment, coins 336a and 336b can be placed on a rail 348 by a mechanism similar to the coin pickup assembly 241 described above in reference to FIG. 2. A radiation source 380 can direct electromagnetic radiation, for example visible or infrared light, toward a detector 382, which can be a photodetector that is sensitive to electromagnetic waves emitted by the radiation source 380. When the electromagnetic radiation from the radiation source 380 reaches the detector 382, a first value of output is sent to a controller 384. When a coin that rolls down the rail 348 interrupts the electromagnetic radiation at the detector 382, the detector 382 transmits a second value of output to a controller 384 which, in turn, triggers a signal T to a digital camera 386. Upon receiving the trigger signal T, the digital camera 386 acquires a digital image of the coin rolling on the rail 348. Images can have different pixel resolutions including, for example, 480×640 pixel resolution. In other embodiments, other triggering mechanisms may be used, for example electrical switches in the path of a rolling coin. In at least some embodiments, a series of images of the same coin can be obtained using a high speed digital camera. In some other embodiments, the triggering mechanism may not be needed. Instead, the camera can be configured to run at certain frame acquisition rate. Some of thus acquired frames can be selected for further processing by a software algorithm capable of determining that a coin image is in the frame.

Figure 4:
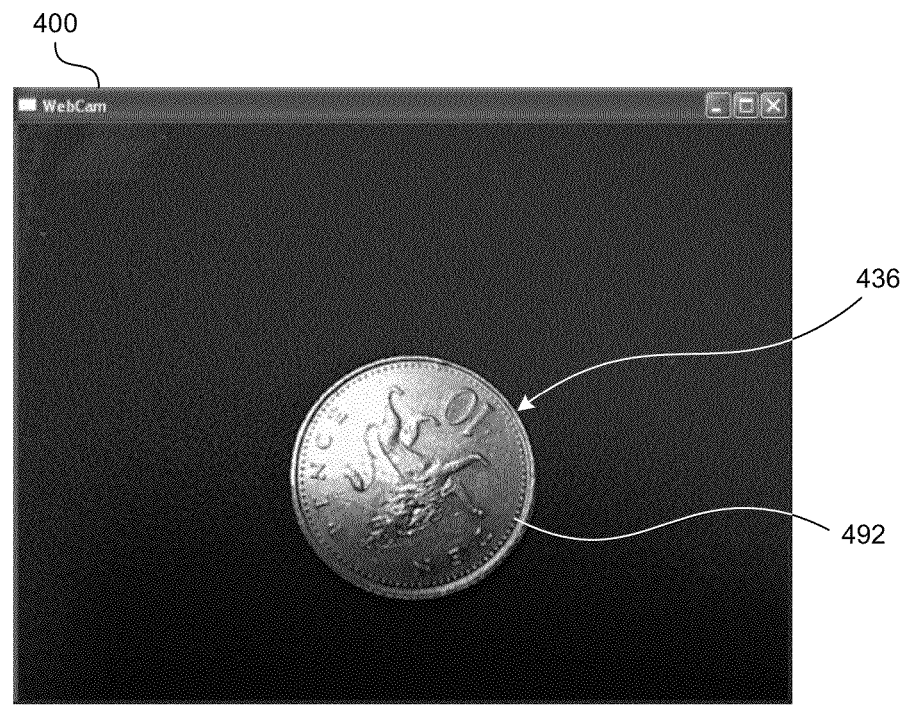
FIG. 4 is a sample image of a coin acquired in accordance with an embodiment of the present technology.

FIG. 4 is a sample digital image 400 of a coin 436. The digital image 400 can be obtained using, for example, the digital image acquisition system shown in FIG. 3. In the embodiment shown in FIG. 4, the background of the coin 436 is much darker than the coin itself, but other backgrounds are also possible. Background subtraction may be used to account for arbitrary background features. The digital image 400 may be a gray image or a color image which is preferably converted to a gray image before further processing. Some coins have numerous dots like dots 492 around the edge of the coin. The size of the dots 492, their mutual separation and their distance from the outer edge of the coin vary among coin denominations. This information can be used for coin discrimination, as explained in more detail below. Other visual features on the face or on the back of the coin 436, such as letters, numbers or embossed images, can also be used to discriminate coins. Another aspect for discriminating coins can be a diameter of the coin. While it is possible to determine a diameter of the coin directly from the digital image, a more robust or accurate diameter determination can be achieved using edge detection algorithms known in the art. Such edge detection methods include, for example, Canny, Hough, Marr-Hildreth, Deriche, and Phase Congruency edge detection methods.

Figure 5:
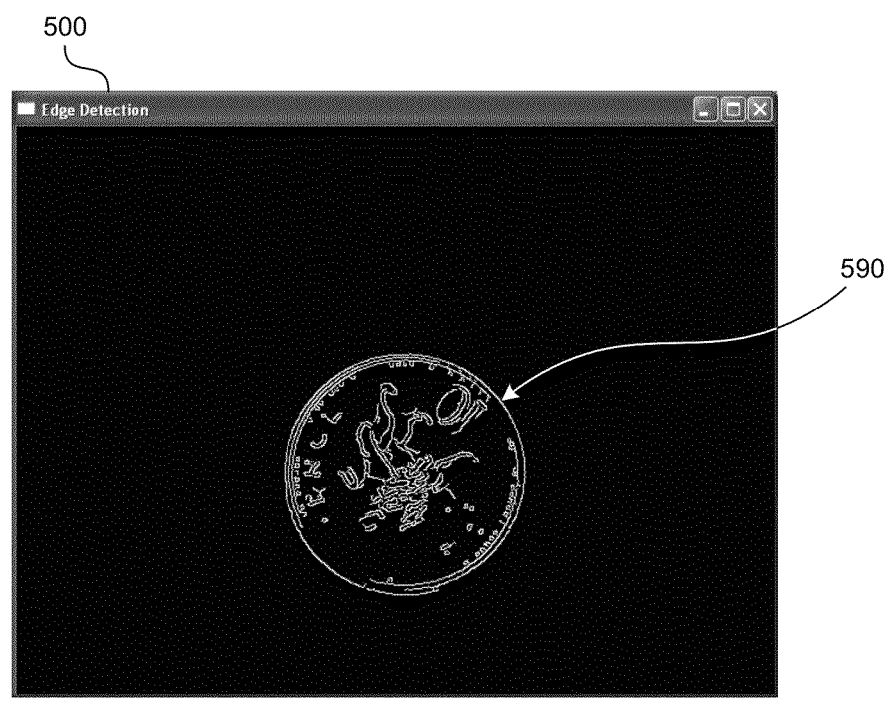
FIG. 5 is a sample image of the coin from FIG. 4 after implementing edge detection in accordance with an embodiment of the present technology.

FIG. 5 shows an image 590 that was generated by executing a Canny edge detection algorithm on the digital image 436 shown in FIG. 4. For improved edge detection, the digital image 436 can be pre-processed by artificially introducing a broad band noise (i.e., a Gaussian noise) to the image which, in turn, reduces the occurrence of the false-positive edge detections. Canny edge detection method calculates intensity gradients between the neighboring pixels in the image. Large intensity gradients are more likely to correspond to edges than small intensity gradients. In most cases it is difficult to a-priori specify a threshold at which a given intensity gradient corresponds to an edge. Therefore, the Canny edge detection method makes an assumption that important edges should be along continuous curves in the image. This assumption promotes constructions of a continuous line while discarding a few noisy pixels that produce large gradients, but do not constitute the continuous line. Other refinements of the basic Canny edge detection method are known in the art. For example, a second or a third derivative of the neighboring pixel intensities can be used to improve the detection results. The detected edges can be represented in a binary image, for example the image 590, where each pixel in the image has an intensity of either an edge pixel (e.g., high) or a non-edge pixel (e.g., low). Various suitable computer programs that perform Canny edge detection methods are available in public domain. For example, cv::Canny algorithm in the OpenCV computer vision library can be used. Once the edges on the coin surface are determined using an edge detection algorithm, a diameter and a center of the coin can be found as explained with reference to FIG. 6 below.

Figure 6:
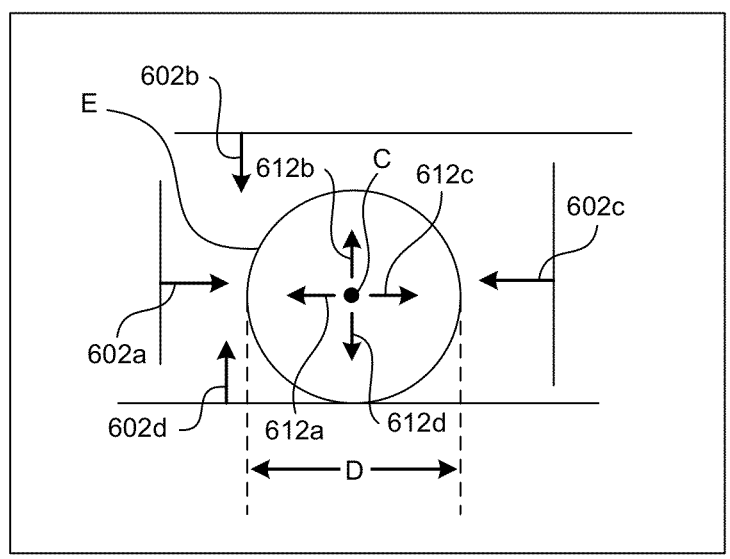
FIG. 6 is a schematic illustration of coin diameter determination in accordance with an embodiment of the present technology.

FIG. 6 is a schematic diagram illustrating a method of coin diameter detection in accordance with an embodiment of the present technology. The diameter of the coin can be detected using the digital image 590 (shown in FIG. 5), which has a circumference or an outer coin edge E. A marching scheme schematically illustrated with the arrows 602a-d in FIG. 6 can be used to check pixel values in a particular row or column of the digital image starting from the outer edges of the image. The marching scheme can continue in a particular direction until a pixel having a certain predetermined threshold value is found, which signifies a detection of a point on the outer edge E. The diameter and the center of the coin can be calculated when at least three points on the outer edge E are detected. In some other embodiments, a marching scheme schematically illustrated with the arrows 612a-d can be used. In this marching scheme, a search for the edge of the coin starts from the center of the image, which corresponds to the center of the coin in FIG. 6, but other images where the center of the coin is not at the center of the image are also possible. The marching scheme illustrated by the arrows 612a-d may be preferred when the outline of the coin is significantly smaller than the overall digital image. However, the outline of the coin should include the center of the image for this marching scheme to work properly. A person having ordinary skill in the art would know other methods of finding coin diameter and center from a digital image of the edges of the coin including, for example, a HoughCircles algorithm from the OpenCV computer vision library. The diameter of the coin can be used to discriminate among coins.

For various coin denominations, the dots along the coin edge can have different size, spacing (distance from the neighboring dots), and/or distance from the coin edge. These different dot patterns can be used to calculate spectral aspects that are useful in discriminating coins. Additionally, the lettering, numbering, and images stamped on the coins also contain spectrally distinct aspects. However, the spectral processing of a generally round object within a rectangular digital image can be difficult. Therefore, in at least some embodiments of the present technology, a round digital image of the coin can be transformed to a rectangular image, which is better suited for the subsequent spectral processing.

Figure 7:
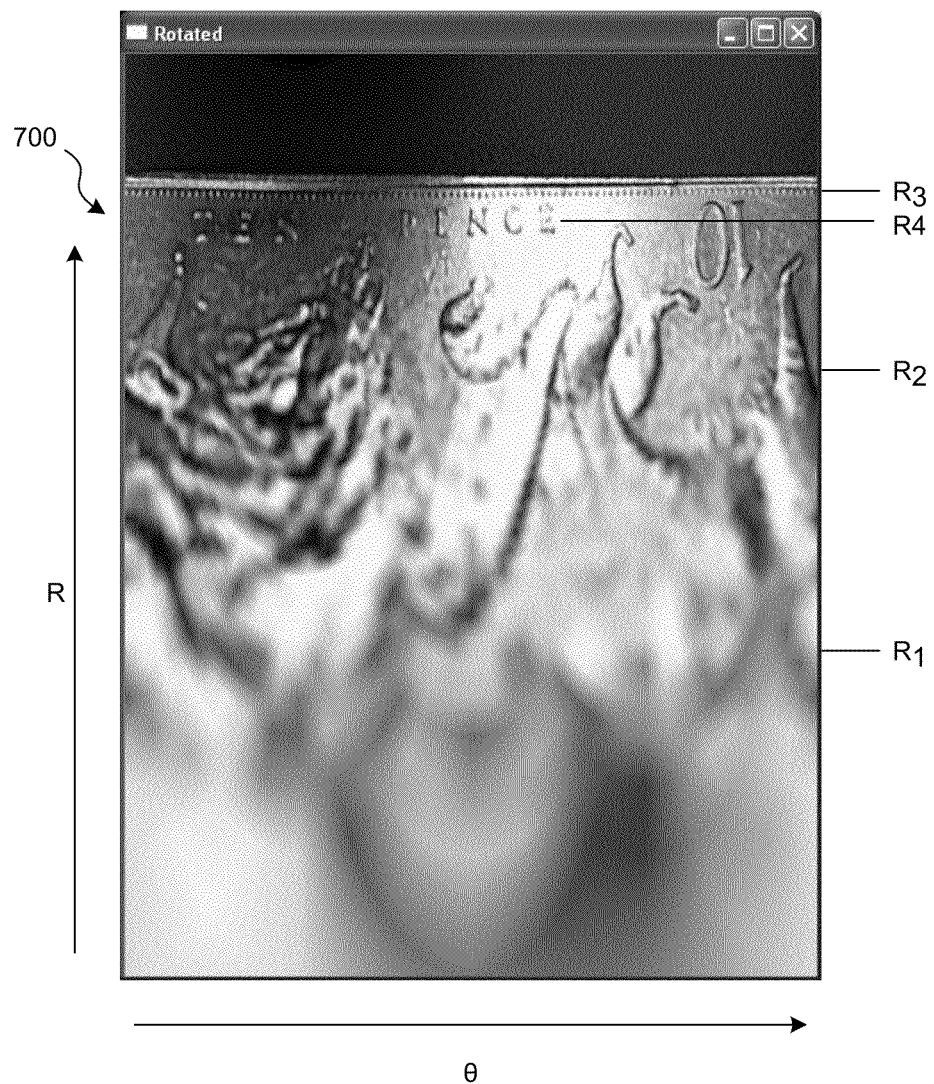
FIG. 7 illustrates results of a log-polar transform performed in accordance with an embodiment of the present technology on the coin image from FIG. 4.

FIG. 7 illustrates an example of a transformed image 700 of the coin 436 shown in FIG. 4. The transformed image 700 can be generated by, for example, log-polar transform as in the Equation 1 below:

$$R = \log\sqrt{x^2 + y^2} \qquad \text{(Equation 1)}$$

-continued $$\Theta = \arctan\frac{y}{x}$$

where x and y are the locations of the pixels relative to the center of the coin in the digital image shown in FIG. 4. By applying equation 1, the pixels from the image in FIG. 4 are rearranged into a rectangular image as shown in FIG. 7. The horizontal axis of the image in FIG. 7 corresponds to different θ values on the coin, ranging from 0° to 360° (0 to 2π). Thus, the range from the minimum (θ=0°) to the maximum (θ=360°) on the horizontal axis θ of FIG. 7 corresponds to the full circumference of the coin. The vertical axis R is a logarithm of the distance from the center of the coin. For example, the lettering "TEN PENCE," which is at the same radial distance from the center of coin in FIG. 5, appears at the same vertical axis R (i.e., $R_4$) in the R-θ graph of FIG. 7. Similarly, the dots in the vicinity of the edge of the coin in FIG. 4 map to a constant R (i.e., $R_3$), location in FIG. 8. The overall richness of the features of the coin image in FIG. 7 will be different at different values of the vertical axis R. Some representative values of the vertical axis R are marked as $R_1$, $R_2$, and $R_3$, corresponding to the low, medium and high feature/frequency content, respectively. A spectral analysis can be performed per each row or column of the rectangular image of FIG. 7. Additionally or in the alternative, several rows and/or columns can be analyzed to produce spectral results. The examples of such spectral analysis are shown in FIG. 8 below.

Figure 8:
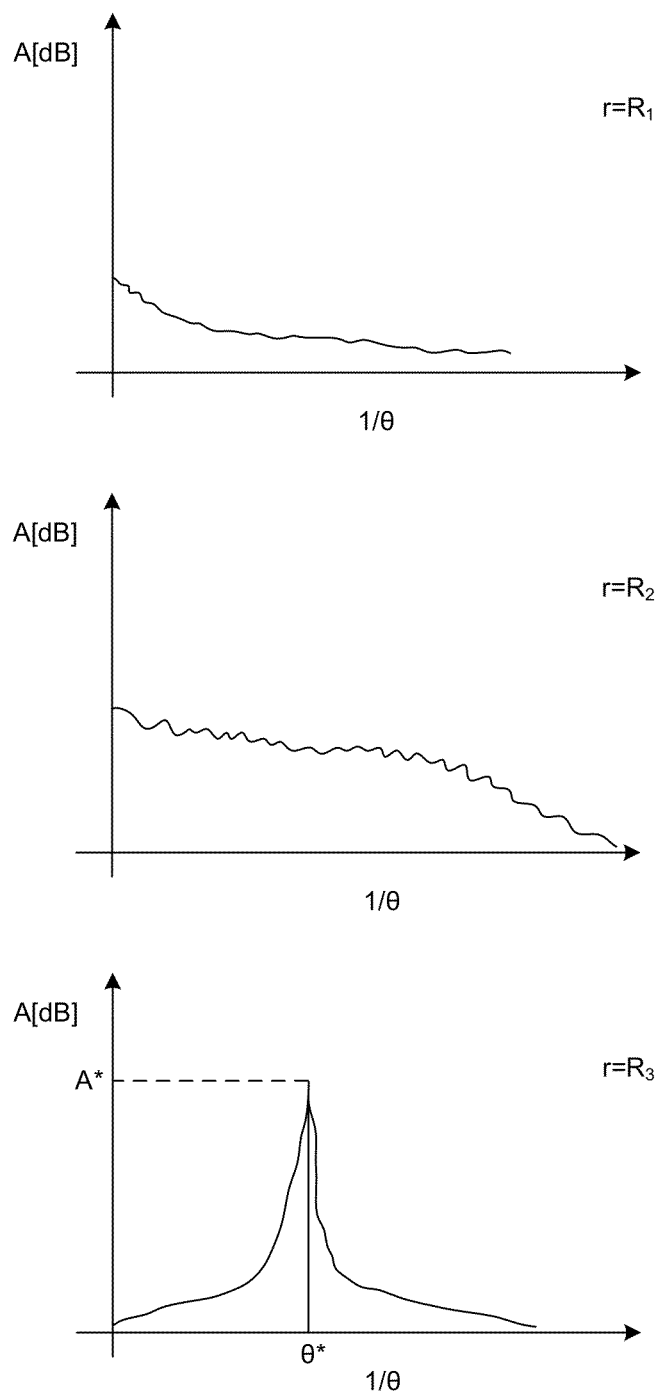
FIG. 8 illustrates a series of results of a Fourier transform performed on the coin image from FIG. 7 in accordance with an embodiment of the present technology.

FIG. 8 schematically illustrates sample results of the spectral analysis performed on the rectangular image shown in FIG. 7. The three sample results shown correspond to the values $R_1$, $R_2$, and $R_3$ in FIG. 7. The analysis can be performed by, for example, a known Fourier transform, which maps the pixel values at a given row (or a group of rows or columns) into a 2D space having 1/θ as one dimension and Amplitude in decibels (dB) or linear scale as the second dimension. Other types of suitable transforms known to a person skilled in the art can also be used including, for example, Z-transforms and wavelet transforms.

The upper graph in FIG. 8 corresponds to $R=R_1$, where relatively little spectral content is present in the rectangular image of FIG. 7. Therefore, the amplitudes (A) in the upper graph of FIG. 8 are relatively low and flat. The middle graph in FIG. 8 corresponds to the row $R=R_2$ in the rectangular image of FIG. 7. At that location, more features/frequencies are present, resulting in higher amplitudes (A) in the graph. The lower graph in FIG. 8 corresponds to the row $R=R_3$ in the rectangular image of FIG. 7, which is the location with the dots. Due to the high regularity of the dots along the $R=R_3$ row, the corresponding spectral peak (Amplitude) in the graph in FIG. 8 is localized at a distinct 1/θ value. Additionally, due to the high differences in the pixel intensity values between the dots and their surrounding, the spectral peak (Amplitude) is high compared to other spectral peaks in the graphs. The graphs in FIG. 8, which are the results of the Fourier transforms for particular R locations in the rectangular image of FIG. 7, can be used as additional aspects for the coin discrimination, as explained in more details with reference to FIG. 10 below.

Figure 9:
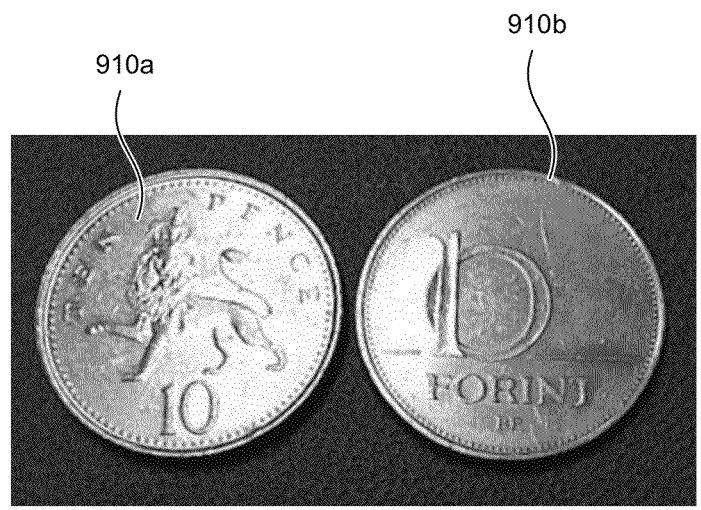
FIG. 9 shows digital images of two sample coins.

FIG. 9 shows digital images of two sample coins: a ten pence coin 910a on the left and a ten forint coin 910b on the right. The two coins have approximately the same diameter. If the coins also have a similar metallurgy, they would be difficult to discriminate with conventional discrimination technologies. However, the ten pence coin 910a has dots that are larger and more spaced apart than the dots on the ten forint coin 910b. These differences in the dot size and spacing can be used to discriminate the two coins using the technology described in detail herein.

Figure 10:
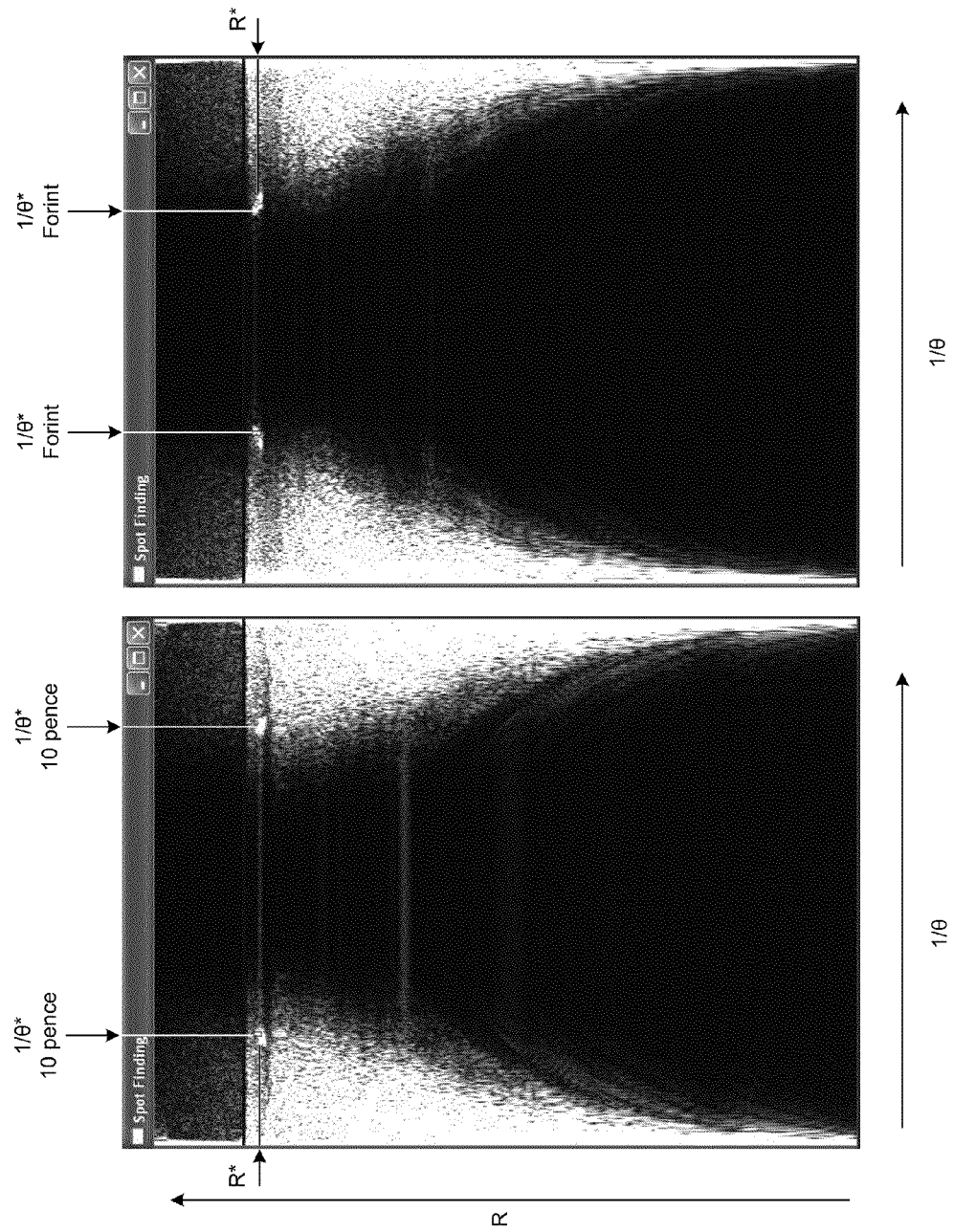
FIG. 10 illustrates results of a Fourier transform performed on the sample coins from FIG. 9 in accordance with an embodiment of the present technology.

FIG. 10 shows sample results of a row-by-row Fourier transform for the ten pence coin 910a (shown on the left-hand side of FIG. 10) and the ten forint coin 910b (shown on the right-hand side of FIG. 10) performed on the corresponding rectangular images. Both graphs in FIG. 10 have 1/θ on the horizontal axis and R on the vertical axis. The gray value in the graphs corresponds to the values of the spectral peaks for a given (1/θ, R) pair. In other words, the graphs in FIG. 10 can be obtained by, for example, running a Fourier transform for many or for all R s in the rectangular image of FIG. 8, and graphing the results of the Fourier transforms as shown in FIG. 10, where a gray level in the graph corresponds to the linear value of the corresponding logarithmic spectral amplitude (A) in FIG. 8.

The bright spots marked by the arrows in the graphs in FIG. 10 correspond to the maximum values of the spectral amplitude (A*), which will be different for different coins. The maximum values of the spectral amplitude can be found by applying search algorithms on the results of the Fourier transform. For example, a rectangle of desired size can be defined and marched over the results of the Fourier transform while averaging the spectral amplitude for the data points within the rectangle, thus producing a local average. Additionally, the 1/θ location of the maximum values of the spectral amplitude depends on the angular distance between the dots, i.e., the number of the dots along the perimeter of the coins. Therefore, the left-most 1/θ location of the amplitude peaks for the ten pence coin 910a is closer to the 1/θ=0 location than the corresponding amplitude peak for the ten forint coin 910b, indicating that the angle θ between the dots on the ten pence coin 910a is bigger than the corresponding angle θ for the ten forint. The 1/θ location of the spectral amplitude peak is another aspect of a coin that can be used to discriminate the coins. Additional aspects and/or features of the coins can be derived using other suitable methods known in the art. For example, best fit contours can be drawn using the graphs in FIG. 8, and then used as the aspects corresponding to the ten pence and/or ten forint coins. Additional aspects of the coins could be identified by, for example, a search algorithm finding the max/min values in any given row/column or a group of rows/columns. Furthermore, a spatial filtering could be used to eliminate one of the aliased peaks (i.e., the mirror image peaks) at the R* locations in the graphs of FIG. 10. Furthermore, instead of using the spatial filtering one of the mirror image sides of the graph can be discarded.

Figure 11:
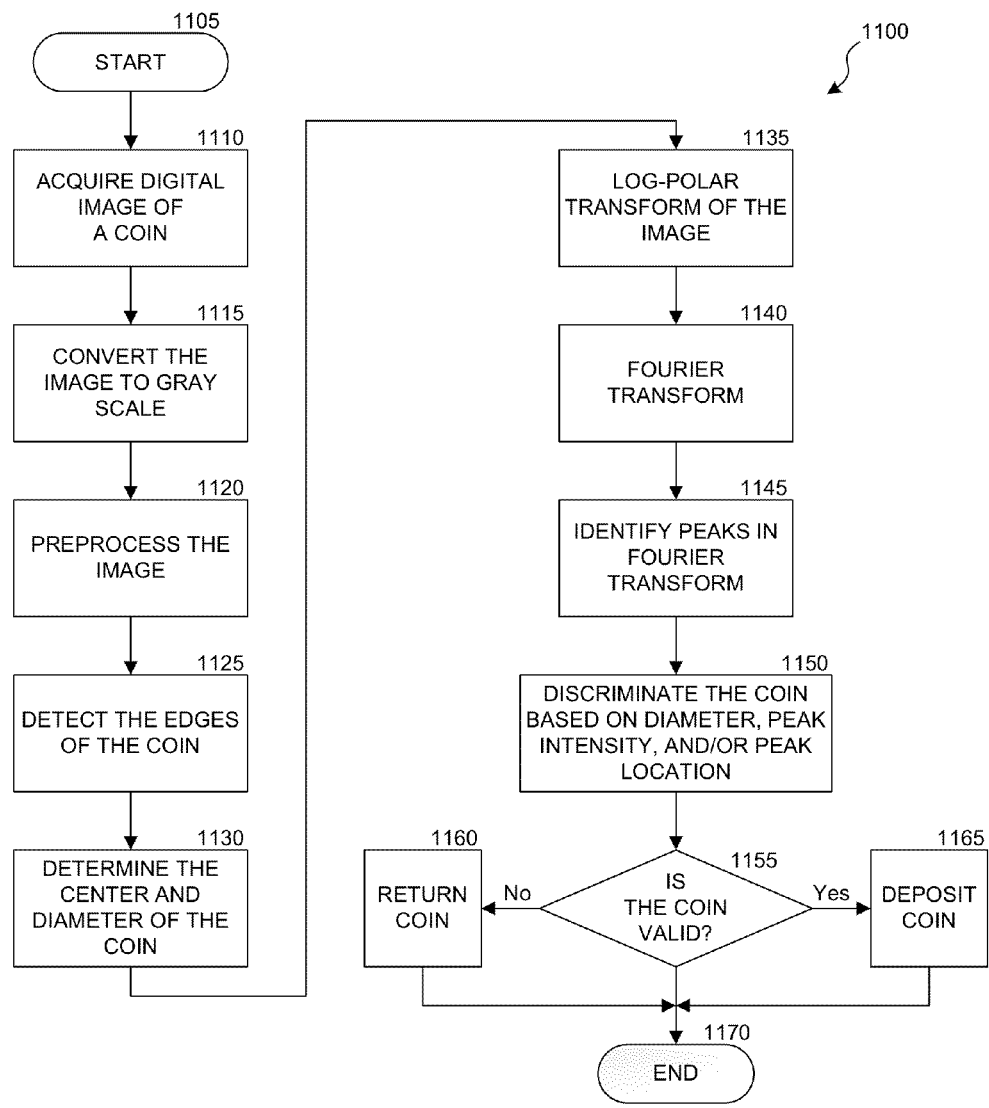
FIG. 11 is a flow diagram illustrating a method for discriminating coins in accordance with an embodiment of the present technology.

FIG. 11 illustrates a flow diagram of a routine 1100 for discriminating coins in accordance with an embodiment of the present technology. The routine 1100 can be performed by one or more host computers according to computer-readable instructions stored on various types of suitable computer readable media known in the art. The process flow 1100 does not show all steps for discriminating coins, but instead provides an understanding of the process steps in some embodiment of the technology. Those of ordinary skill in the art will recognize that some process steps can be repeated, varied, omitted, or supplemented, and other (e.g., less important) aspects not shown may be readily implemented.

The process flow 1100 starts in block 1105. In block 1110, a digital image of the coin is obtained using, for example a digital camera or a CCD (Charge Coupled Device) camera. In some embodiments, the digital image acquisition system shown in FIG. 4 can be used to obtain the digital image. The image can be color or gray scale. If color, the image can be converted to gray scale in block 1115. Gray scale image may be better suited for further processing, because the pixel values in the image correspond to the intensity of light received by the pixels. The resolution of the image should be sufficient to resolve the features on the coin, for example, the dots or the text on the coin. Digital images having resolutions of 480× 640 pixels or other resolutions may be used.

In block 1120, the digital image is preprocessed, i.e., the image is conditioned for subsequent processing because some edge detection methods can generate false positives. Therefore, the preprocessing step 1120 can use a filtering scheme based on convolving the image obtained in block 1110 (or block 1115) with, for example, a Gaussian filter. The resulting image is a slightly blurred version of the original one, but it has a benefit of not being affected to a significant degree by, for example, a single noisy pixel.

In block 1125, the edges of the image, including the outline of the coin are detected. Different edge detection algorithms are known to those of ordinary skill in the art. Some examples are Canny, Hough, Marr-Hildreth, Deriche, and Phase Congruency edge detection methods. In some embodiments, a combination of edge detection algorithms can be used to optimize the results. The detected edges can be assigned some high value in the image (e.g., max value that the digital image pixel can assume), while the remainder of the non-edge pixels can be set to some small pixel value or to zero.

Having detected the edge of the coin, its center and diameter can be found in block 1130 by, for example, examining the image containing the edges of the coin to determine at least three points on the outside edge of the coin, followed by a calculation of the coin's center and diameter. In some other embodiments, the diameter and the center of the coin can be determined by applying the HoughCircles algorithm from the OpenCV computer vision library or by applying other algorithms known to those of ordinary skill in the art. The diameter of the coin can be used as a coin aspect (i.e., a property) to discriminate coins.

Once the center of the coin is known, a typically round image of the coin can be converted to a rectangular image in block 1135 using, for example, the log-polar or the polar transform, because a rectangular image can be better suited for the spectral transforms of the image, for example a Fourier transform as in block 1140. A spectral transform maps the R-θ space to the Amplitude-(1/θ) space. The rows or areas having high regularity of the features, for example, the row of the dots along the edge of the coins, will cause higher amplitudes in the spectral plot in comparison to those rows of the rectangular image that are relatively void of graphical features. The peak amplitudes can be detected in block 1145. The amplitude and the location of the spectral peaks can be used as the additional coin aspects to discriminate among the coins.

In block 1150, one or more coin aspects (diameter, spectral peak intensity and location) can be compared with known values for the applicable range of acceptable coins using, for example, a look-up table. When one or more coin aspects are matched against one or more known values, the coin denomination can be determined, and the system can credit the coin accordingly.

In block 1155, a decision is made about coin validity based on the discrimination results in block 1150. If the coin is determined to be valid in decision block 1155, the coin is deposited in block 1165. On the other hand, if the coin is determined to be not valid in block 1155, the coin is returned to the user in block 1160. The process of coin discrimination ends in block 1170, and can be restarted in block 1105 for the next coin.

Each of the steps depicted in the process flow 1100 can itself include a sequence of operations that need not be described herein. Those of ordinary skill in the art can create source code, microcode, and program logic arrays or otherwise implement the disclosed technology based on the process flow 1100 and the detailed description provided herein. All or a portion of the process flow 1100 can be stored in a memory (e.g., non-volatile memory) that forms part of a computer, or it can be stored in removable media, such as disks, or hardwired or preprogrammed in chips, such as EEPROM semiconductor chips.

Figure 12:
FIG. 12 shows back and front views of a coin that can be discriminated in accordance with embodiments of the present technology.

FIG. 12 shows the front and the back sides of a sample coin, e.g., the ten forint coin 910*a* of FIG. 9. The embodiments of the technology described above can discriminate the coin irrespective of whether a front or a back side of the coin is facing the digital image camera. For example, if the dots close to the edge of the coin have the same size and spacing on both sides, as is typical with the coins, the spectral image will also result in the same relevant aspects. If, on the other hand, the spacing and size of the dots differ on the two sides of the coin, then the spectral images of the two sides of the coin will be different, but they can still be successfully identified using, for example look-up tables containing known properties for both sides of acceptable coins.

Figure 13:
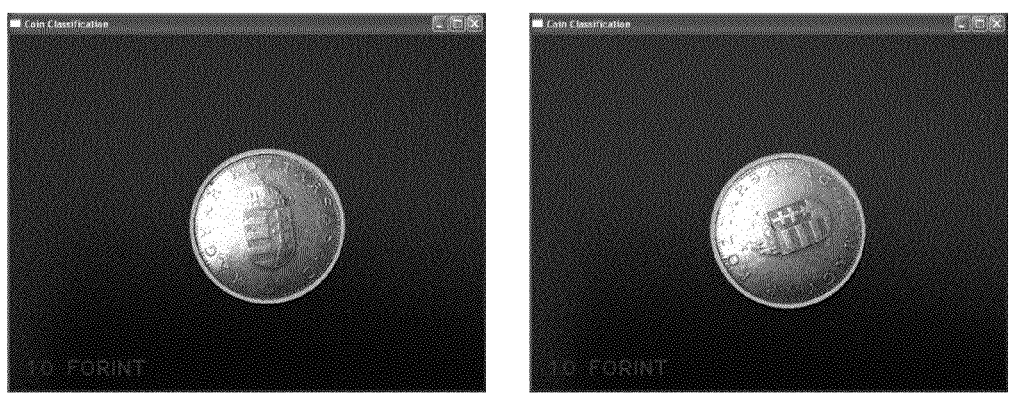
FIG. 13 shows several views of a coin that can be discriminated in accordance with embodiments of the present technology.
Figure 13:

FIG. 13 shows four digital images of a sample coin (e.g., the ten forint 910*b*) at different angular orientations. A transformation that creates a rectangular image, for example, a log-polar image as in Equation 1, will arrange the pixels in the rectangular image at the relevant R location and a θ offset from one image to another, depending on the rotation angle of the coin. However, the subsequent spectral analysis is periodic in nature and, thus, it is insensitive to the exact beginning and end of the rows in the rectangular image. Consequently, the embodiments of the present technology can discriminate the coin irrespective to the angular orientation of the coin image.

Figure 14:
FIG. 14 shows a view of a partially obscured coin that can be discriminated in accordance with embodiments of the present technology.

FIG. 14 shows a digital image of a partially obscured sample coin. The imperfection of the image can be caused by, for example, a piece of paper being stuck to the face of the coin, a damaged coin, etc. This may result in a somewhat lower amplitude of the spectral peaks, but at the same 1/θ location. However, with at least some of the embodiments of the present technology the spectral aspects of a partially obscured coin can still be used to discriminate the coin because the diameter of the coin, 1/θ location of the spectral peak and/or a reduced spectral peak at the 1/θ location may still be enough to discriminate the coin.

Figure 15:
FIG. 15 shows several coins that can be discriminated in accordance with embodiments of the present technology.

FIG. 15 shows four digital images of samples of successfully discriminated coins. For example, the digital image of the sample coin in the lower right corner of FIG. 16 is not completely round, but the embodiments of the present technology can be used to successfully discriminate this non-round coin by assigning an approximate diameter value to it. Furthermore, some coins do not have dots along the periphery like, for example, the sample coin in the upper right corner image of FIG. 15. However, even these coins will have some distinguishable spectral characteristics which can be coupled with, for example, the coin diameter to discriminate the coin.

From the foregoing, it will be appreciated that specific embodiments of the invention have been described herein for purposes of illustration, but that various modifications may be made without deviating from the spirit and scope of the various embodiments of the invention. For example, optical character recognition using the letters and/or numbers on the coin can be used to discriminate the coins. Additionally, the methods explained with reference to FIGS. 4-15 above can be combined with the prior art methods based on the mass and metallurgy of the coin. Further, while various advantages and features associated with certain embodiments of the disclosure have been described above in the context of those embodiments, other embodiments may also exhibit such advantages and/or features, and not all embodiments need necessarily exhibit such advantages and/or features to fall within the scope of the disclosure. Accordingly, the disclosure is not limited, except as by the appended claims.

We claim:

1. A method for identifying coins, the method comprising:
   obtaining a first image of a coin;
   generating a second image from the first image;
   transforming the second image to a 2D third image using a 2D Fourier transform;
   identifying at least one of a location and an intensity of a spectral peak in the 2D third image; and
   comparing at least one of the location and the intensity of the spectral peak in the 2D third image to at least one known coin property.

2. The method of claim 1 wherein the first image is a digital image.

3. The method of claim 2, further comprising:
   converting the first image of the coin to a gray scale image.

4. The method of claim 1 wherein the first image is obtained in response to a signal generated by a coin movement.

5. The method of claim 1 wherein the first image is obtained by a digital camera running at a frame rate.

6. The method of claim 1 wherein generating the second image from the first image includes applying a log-polar mapping to the first image.

7. The method of claim 1 wherein generating the second image from the first image includes applying a polar mapping to the first image.

8. The method of claim 1, further comprising:
   comparing at least one aspect of the first image to at least one known coin property.

9. The method of claim 8 wherein the at least one aspect of the first image is a coin diameter.

10. The method of claim 1, further comprising:
    identifying an outline of the coin.

11. The method of claim 10 wherein identifying the outline of the coin includes applying a Canny edge detection method to the first image.

12. The method of claim 10 wherein identifying the outline of the coin includes applying at least one of Hough, Marr-Hildreth, Deriche, and Phase Congruency edge detection method to the first image.

13. The method of claim 10, further comprising:
    determining a diameter of the coin from the outline of the coin.

14. The method of claim 9, further comprising:
    setting first image pixel values to zero outside the outline of the coin.

15. The method of claim 10, further comprising:
    applying a Gaussian filter to the first image.

16. A method for discriminating coins, the method comprising:
    obtaining a first image of a coin;
    identifying an outline of the coin from the first image;
    generating a rectangular image from the first image by a log-polar mapping;
    performing a Fourier transform of the rectangular image to generate a 2D transformed image; and
    discriminating the coin by—
       identifying at least one of a location and an intensity of a spectral peak in the 2D transformed image, and
       comparing at least one of the location and the intensity of the spectral peak in the 2D transformed image to at least one known coin property.

17. The method of claim 16 wherein the first image is obtained in response to a signal generated by a coin movement.

18. The method of claim 16 wherein the first image is obtained by a digital camera running at a frame rate.

19. The method of claim 16 wherein the at least one aspect of the first image is a diameter of the coin.

20. A consumer operated coin counting apparatus comprising:
    a coin input region configured to receive a plurality of coins;
    a digital camera configured to capture first images of individual coins;
    means for generating second images of the coins from the first images of the coins;
    means for generating 2D third images from the second images of the coins using a 2D Fourier transform; and
    means for discriminating the coins by—
       identifying at least one of a location and an intensity of a spectral peak in the 2D third images, and
       comparing at least one of the location and the intensity of the spectral peak in the 2D third images to at least one known coin property.

21. The apparatus of claim 20, further comprising means for comparing at least one aspect of the first images to at least one known coin property.

22. The apparatus of claim 20 wherein the means for generating the second images include means for log-polar mapping.

23. The apparatus of claim 20 wherein the means for generating the second images include means for polar mapping.

24. The apparatus of claim 20, further comprising means for detecting outline of the coins.

25. The apparatus of claim 20 wherein the at least one aspect of the first images is diameter of the coins.

26. A non-transitory computer-readable medium whose contents cause a computer to discriminate coins, the coins being discriminated by a method comprising:
    receiving multiple coins;
    capturing a first image of a coin;
    generating a second image from the first image;
    generating a 2D third image from the second image using a 2D Fourier transform; and
    discriminating the coins by—
       identifying at least one of a location and an intensity of a spectral peak in the 2D third images, and
       comparing at least one of the location and the intensity of the spectral peak in the 2D third image to a known coin property.

27. The computer readable medium of claim 26 wherein the method further comprises accepting or rejecting the coin based on results of discriminating.

28. The computer readable medium of claim 26 wherein generating the second image from the first image includes a log-polar mapping.

29. The computer readable medium of claim 26 wherein the at least one aspect is a coin diameter.

30. A method performed by a computer having a computer code for identifying coins, the method comprising:
    obtaining a first image of a coin;
    generating a second image from the first image;
    transforming the second image to a 2D third image using at least one of a Z-transform or a wavelet transform;

identifying at least one of a location and an intensity of a spectral peak in the 2D third image; and comparing at least one of the location and the intensity of the spectral peak in the 2D third image to at least one known coin property.

31. A consumer operated coin counting apparatus comprising:
   a coin input region configured to receive a plurality of coins;
   a camera configured to capture first images of individual coins; and
   a computer having a non-transitory computer-readable medium whose contents cause the computer to discriminate the coins by—
      generating second images of the coins from the first images of the coins,
      generating 2D third images from the second images of the coins using at least one of a Z-transform or a wavelet transform,
      identifying at least one of a location and an intensity of a spectral peak in the 2D third images, and
      comparing at least one of the location and the intensity of the spectral peak in the 2D third images to at least one known coin property to discriminate the coins.

* * * * *

UNITED STATES PATENT AND TRADEMARK OFFICE
CERTIFICATE OF CORRECTION

| | | |
|---|---|---|
| PATENT NO. | : 9,036,890 B2 | Page 1 of 1 |
| APPLICATION NO. | : 13/489043 | |
| DATED | : May 19, 2015 | |
| INVENTOR(S) | : Jeffrey A. Borg et al. | |

It is certified that error appears in the above-identified patent and that said Letters Patent is hereby corrected as shown below:

On the page 6, in column 1, under "Other Publications", line 9, delete "Microship" and insert -- Microchip --, therefor.

On the page 7, in column 1, under "Other Publications", line 1, delete "infromation" and insert -- information --, therefor.

On the page 7, in column 1, under "Other Publications", line 1, delete "Satement Recieved" and insert -- Statement received --, therefor.

On the page 7, in column 1, under "Other Publications", line 1, delete "UPSTO" and insert -- USPTO --, therefor.

On the page 7, in column 1, under "Other Publications", line 3, delete "Recieved" and insert -- Received --, therefor.

On the page 7, in column 1, under "Other Publications", line 3, delete "UPSTO" and insert -- USPTO --, therefor.

On the page 7, in column 1, under "Other Publications", line 23, delete "Selectronic" and insert -- Electronic --, therefor.

On the page 7, in column 1, under "Other Publications", line 25, delete "Selectronic" and insert -- Electronic --, therefor.

On the page 7, in column 1, under "Other Publications", line 41 delete "Referens" and insert -- Reference --, therefor.

Signed and Sealed this
Twenty-second Day of March, 2016

Michelle K. Lee
*Director of the United States Patent and Trademark Office*